(12) United States Patent
Speiser et al.

(10) Patent No.: US 11,126,898 B2
(45) Date of Patent: Sep. 21, 2021

(54) COMPUTER VISION CLASSIFIER USING ITEM MICROMODELS

(71) Applicant: Markov LLC, Los Altos, CA (US)

(72) Inventors: Leonard Robert Speiser, Los Altos, CA (US); Joel T. Kaardal, Redwood City, CA (US)

(73) Assignee: Markov LLC, Los Altos, CA (US)

( * ) Notice: Subject to any disclaimer, the term of this patent is extended or adjusted under 35 U.S.C. 154(b) by 176 days.

(21) Appl. No.: 16/425,448

(22) Filed: May 29, 2019

(65) Prior Publication Data

US 2020/0380315 A1    Dec. 3, 2020

(51) Int. Cl.
*G06K 9/62* (2006.01)
*G06K 9/66* (2006.01)
*G06K 9/00* (2006.01)

(52) U.S. Cl.
CPC ....... *G06K 9/6277* (2013.01); *G06K 9/00456* (2013.01); *G06K 9/6227* (2013.01); *G06K 9/6253* (2013.01); *G06K 9/6256* (2013.01); *G06K 9/66* (2013.01); *G06K 2209/17* (2013.01)

(58) Field of Classification Search
CPC .. G06K 9/6277; G06K 9/6256; G06K 9/6227; G06K 9/66; G06K 9/6253; G06K 9/00456; G06K 2209/17; G06K 9/6262; G06K 9/6271; G06N 3/02
USPC ......................................... 382/157
See application file for complete search history.

(56) References Cited

U.S. PATENT DOCUMENTS

| | | | |
|---|---|---|---|
| 5,577,166 A | 11/1996 | Mizuno | |
| 5,995,651 A | 11/1999 | Gelenbe et al. | |
| 9,129,190 B1 | 9/2015 | Ranzato | |
| 9,552,549 B1 | 1/2017 | Gong et al. | |
| 9,639,780 B2 | 5/2017 | Ranzato et al. | |
| 9,668,699 B2 | 6/2017 | Georgescu et al. | |
| 9,928,448 B1* | 3/2018 | Merler | G06K 9/6285 |
| 9,990,558 B2 | 6/2018 | Lin et al. | |
| 9,996,555 B1 | 6/2018 | Malpani et al. | |
| 10,007,866 B2 | 6/2018 | Criminisi et al. | |
| 10,049,307 B2 | 8/2018 | Pankanti et al. | |
| 2014/0029839 A1* | 1/2014 | Mensink | G06K 9/6272 382/159 |
| 2015/0055855 A1* | 2/2015 | Rodriguez | G06K 9/6259 382/159 |
| 2016/0203525 A1* | 7/2016 | Hara | G06K 9/6277 705/14.56 |

(Continued)

OTHER PUBLICATIONS

A. Krizhevsky, et al., "ImageNet Classification with Deep Convolutional Neural Networks", 9 pages, (accessed May 21, 2019, https://papers.nips.cc/paper/4824-imagenet-classification-with-deep-convolutional-neural-networks.pdf).

(Continued)

*Primary Examiner* — Ali Bayat
(74) *Attorney, Agent, or Firm* — Daylight Law, P.C.

(57) ABSTRACT

Methods, storage media, and systems are disclosed. Exemplary implementations may: provide an encoding derived from an image of an item; provide a set of networks; individually apply the encoding to each network in the set of networks; generate, in response to the applying, a set of classification probabilities; identify a specific network in the set of networks which generated the largest classification probability in the set of classification probabilities; and associate the item with a specific class from the set of classes.

28 Claims, 17 Drawing Sheets

(56) References Cited

U.S. PATENT DOCUMENTS

2016/0307072 A1\* 10/2016 Zhou .................... G06K 9/66
2017/0213112 A1\* 7/2017 Sachs .................... G06T 7/90
2017/0287137 A1\* 10/2017 Lin ...................... G06N 3/08

OTHER PUBLICATIONS

D. Ciresan, et al., "Multi-column Deep Neural Networks for Image Classification", Technical Report No. IDSIA-04-12, IDSIA-USI-SUPSI, Feb. 13, 2012, 8 pages.
J. Kittler, et al., "On Combining Classifiers", IEEE Transactions on Pattern Analysis and Machine Intelligence, vol. 20, No. 3, Mar. 1998, pp. 226-239.
L. Xu, et al., "Combining Classifiers and Learning Mixture-of-Experts", Encyclopedia of Artificial Intelligence, IGI Global Publishing Company, 2009, ISBN: 978-1-59904-849-9, pp. 318-326.
M. Egmont-Petersen, et al., "Image Processing with Neural Networks—A Review", Pattern Recognition 35, 2002, pp. 2279-2301.

\* cited by examiner

COMPUTER VISION CLASSIFIER USING ITEM MICROMODELS

BACKGROUND

Classifiers are algorithms that take an input and determine a class associated with that input. The output of the classifier in response to the input is the class of that input. Classifiers can be instantiated in numerous ways. FIG. 1 provides the example of an artificial neural network (ANN) 100 that is configured to provide a classification in the form of a text string in response to the application of an input in the form of an encoded image. ANN 100 is a convolutional neural network (CNN) defined by a set of filters and a specified ontology. The filters contain variable filter values that can be altered to train the CNN to improve the ability of the classifier to identify specific classes. The edges in the network are computational operations conducted between the two nodes connected by the edge. For example, an operation could involve a convolution between filter 103 and image encoding [X]. The filter and encoding could be matrixes of numerical values. The ellipses in FIG. 1 represent the fact that standard ANNs are complex structures which involve many millions or billions of operations between a large number of internal values that define the network.

ANN 100 has been trained to classify a type of animal located in an input image. As illustrated, an image of a cat 101 provided to ANN 100 produces an output text string "CAT" 110 while an image of a dog 102 provided to ANN 100 produces an output text string "DOG" 120. Images provided to the input of ANN 100 will be classified in this manner. The network can be trained to identify many classes. Training ANN 100 includes adjusting the internal values of the network using available techniques which are known in the related art. For example, ANN 100 can be trained using a supervised learning routine in which inputs provided to ANN 100 are coupled with a supervisor, or ground truth output, and the output generated by the ANN 100 is compared with the supervisor to determine how the internal variables should be adjusted. An input and accompanying supervisor can also be referred to as a tagged training input. There are known ways by which the comparison is conducted, and the internal variables are adjusted, for example, the internal variables can be adjusted through the use of backpropagation guided by a stochastic gradient descent algorithm. Given a large volume of training inputs, the internal variables of the ANN can ultimately be adjusted so that any image of a dog applied at the input of ANN 100 is classified as a dog by the output, and any image of a cat applied at the input of the ANN 100 is classified as a cat by the output.

In the example of FIG. 1, the tagged training inputs must be representative of each class, lest the network be undertrained for detecting and distinguishing a specific class. Various methods of synthesizing training data can be utilized to assure the proper balance of inputs from each class are applied to train the network. In general, the larger the number of classes the classifier is expected to distinguish, the larger the volume of training data required to represent the classes and allow the network to make finer distinctions amongst that larger number of classes. The training process and volume of training data required can be immense and it can be difficult to find or synthesize enough training data for a given application. Furthermore, once the network has been trained, it can be prohibitively difficult to add an additional class to the network. As the network has been carefully balanced for a given set of classes, adding the additional class will affect the internal variables used to detect all the prior classes. As such, the training data applied to add the additional class should not just be limited to examples of the newest class, and examples of all the other classes should be reapplied to assure that the existing performance of the network is maintained. These requirements make the training process much more complex.

SUMMARY

Methods and systems for classifying items in images using trainable networks are disclosed herein. The trainable networks can be trained to identify items from a single class. The trainable networks can be micromodels. A network trained to identify items from a specific class can be referred to as being "associated" with that class. A micromodel used to identify items from a specific class can be referred to as being "associated" with that class. In specific embodiments of the invention, an encoding of an image of an item can be applied to a set of networks in parallel and each network in the set of networks can generate an inference therefrom in the form of a probability that an item in the image belongs to the class associated with the network. The networks can be part of a multiclass classification system that uses a comparison module to identify the highest probability generated by the set of networks. The multiclass classifier will then classify the item in the image as being in the class associated with the network that generated the highest probability. In these embodiments, the multiclass classification system trusts all the networks in the set of networks equally and assigns the classification based on whichever network is most certain that the item in the image is the item associated with the network. The comparison module can be implemented using at least one comparison logic block instantiated in hardware or software.

In specific embodiments of the invention that include a set of networks as part of a multiclass classification system, the set of networks can be edited to change the set of classes the system can classify by simply adding another network in parallel with the pre-existing networks or removing a network from the pre-existing set. In contrast to modifying the set of classes that a multiclass ANN classifier can identify, adding or deleting a network to a multiclass classification system in accordance with specific embodiments of the disclosed invention would not require additional training of the pre-existing or remaining networks. Instead, all that would be required is to change the number of networks the encoding of the image is routed to and the number of probabilities that are considered by the comparison module. Furthermore, if the networks were trainable networks, the additional networks could be trained in isolation and would have less stringent specifications regarding the classes represented by the training data.

The networks disclosed herein can be directed graph function approximators with adjustable internal variables that affect the output generated from a given input. The networks can be deep nets. The adjustable internal variables can be adjusted using backpropagation. The adjustable internal variables can also be adjusted using a supervised, semi-supervised, or unsupervised learning training routine. The adjustable internal variables can be adjusted using a supervised learning training routine comprising a large volume of training data in the form of paired training inputs and associated supervisors. The pairs of training inputs and associated supervisors can also be referred to as tagged training inputs. The networks can be artificial neural networks (ANNs) such as convolutional neural networks (CNNs).

In specific embodiments of the invention, the networks disclosed herein can be independently trained to identify specific items from a single class which would place less stringent requirements on the synthesis of their training data. However, once combined into a multiclass classification system, the networks can also be trained in parallel in an on-line training routine in which the inference for each network is used in comparison with ground truth feedback to update each network regardless of whether the output of the network was actually selected by the multiclass classification system.

The term micromodel can be used herein to refer to a relatively compact network that has been trained to identify specific items from a single class. However, the micromodel disclosed herein can also be developed using alternative methods that do not require training routines such as closed-form traditional linear programming methods. Regardless of the way the models are developed, the micromodel serves to "model" a class in the sense that it can recognize items of the class in any compatible input image. The micromodel therefore encodes information corresponding to the class associated with the micromodel where the encoding is either done manually or through a training routine.

Specific embodiments of the invention disclosed herein are applicable to food preparation or food vending environments in which food items in a menu need to be distinguished one from the other using an automated system while allowing the menu to vary from time to time. Food items in a menu are conducive to classification via micromodels because they are relatively homogeneous in terms of the texture maps of image encodings thereof but are not uniform enough for closed form classification. In other words food items in menu have relatively similar colors and shapes for pattern recognition systems to identify, though they are not identical to the point where a closed form solution could be used to identify entirely uniform features of the item (e.g., a string of identical text or a wholly unique and repeated pattern of colors, etc.).

In specific embodiments of the invention, the association formed by the multiclass classification systems disclosed herein between food items and classes can be used in numerous applications. The food preparation environment could be an electronic oven having a visible light sensor with a view of the heating chamber of the electronic oven and the ability to conduct a customized heating routine based on the class of item placed in the electronic oven. In another example, the food vending environment could be a refrigerator or store shelf with a visible light sensor having a view of the opening of the refrigerator or edge of the shelf to identify the item and charge a user's account for the price of the item when it is removed. The price of the item could be refunded to the user if the user replaced an item from the same class. The same functionality could be utilized for managing inventory for food items in a vending environment using computer vision.

In specific embodiments of the invention, the networks disclosed herein can be instantiated in a set of distributed locales and be administrated by a centralized system for managing the sets of networks operating at each locale. The centralized system could maintain a library of networks where each entry in the library was a micromodel configured to identify a single class. The networks could be transmitted to the various distributed locals in order to add to the set of networks operating therein. The centralized system could also assist with collecting data for continual online training of the various networks. The online learning could be used to continue to train the networks in the library of networks and transmit updated networks to the various distributed locales. The updates could be sent periodically or based on some other factor such as in response to a detected threshold of performance increase as determined by the centralized system.

One aspect of the present disclosure relates to a method. The method may include providing an encoding derived from an image of an item. The method may include providing a set of networks. The set of networks may have a one-to-one correspondence with a set of classes. The method may include individually applying the encoding to each network in the set of networks. The method may include generating, in response to the applying, a set of classification probabilities. The set of networks may have a one-to-one correspondence with the set of classes. The method may include identifying a specific network in the set of networks which generated the largest classification probability in the set of classification probabilities. The method may include associating the item with a specific class from the set of classes. The specific network may correspond with the specific class in the one-to-one correspondence.

Another aspect of the present disclosure relates to a non-transient computer-readable storage medium having instructions embodied thereon, the instructions being executable by one or more processors to perform a method. The method may include providing an encoding derived from an image of an item. The method may include providing a set of networks. The set of networks may have a one-to-one correspondence with a set of classes. The method may include individually applying the encoding to each network in the set of networks. The method may include generating, in response to the applying, a set of classification probabilities. The set of networks may have a one-to-one correspondence with the set of classes. The method may include identifying a specific network in the set of networks which generated the largest classification probability in the set of classification probabilities. The method may include associating the item with a specific class from the set of classes. The specific network may correspond with the specific class in the one-to-one correspondence.

Yet another aspect of the present disclosure relates to a system. The system may include one or more hardware processors configured by machine-readable instructions. The processor(s) may be configured to provide an encoding derived from an image of an item. The processor(s) may be configured to provide a set of networks. The set of networks may have a one-to-one correspondence with a set of classes. The processor(s) may be configured to individually apply the encoding to each network in the set of networks. The processor(s) may be configured to generate, in response to the applying, a set of classification probabilities. The set of networks may have a one-to-one correspondence with the set of classes. The processor(s) may be configured to identify a specific network in the set of networks which generated the largest classification probability in the set of classification probabilities. The processor(s) may be configured to associate the item with a specific class from the set of classes. The specific network may correspond with the specific class in the one-to-one correspondence.

DETAILED DESCRIPTION

Specific methods and systems associated with networks for classifying items in images in accordance with the summary above are provided in this section. The methods and systems disclosed in this section are non-limiting embodiments of the invention, are provided for explanatory purposes only, and should not be used to constrict the full scope of the invention.

Figure 2:
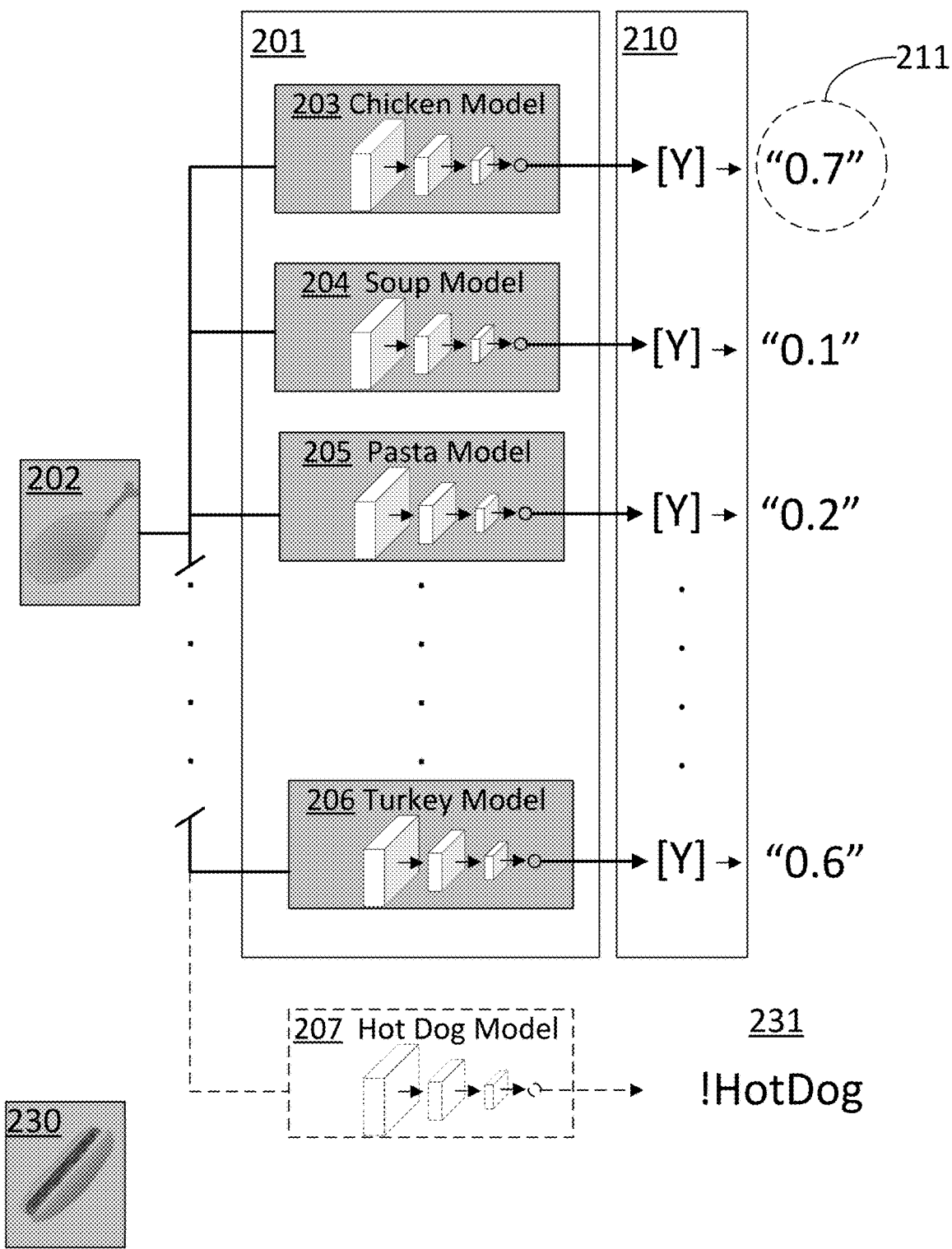
FIG. 2 is a data flow diagram of a multiclass classification system comprising a set of micromodels classifying an encoded input image in accordance with specific embodiments of the invention disclosed herein.

FIG. 2 illustrates a data flow diagram for a multiclass classifier system 200 and an included set of networks 201 that are in accordance with specific embodiments mentioned in the summary above. The set of networks can be a set of micromodels. The networks can each be single class classifiers which are configured to generate an output in the form of a probability that the image contains an item belonging to the class associated with the network. The micromodels can be single class classifiers. The set of networks can have a one-to-one correspondence with a set of classes that are associated with the networks. In FIG. 2, the set of networks 201 is illustrated by four classifiers. The final network in the set of four is offset by an ellipse to illustrate the fact that any number of networks can be connected in parallel to receive an input image. The input image is an image 202 which includes an item in the form of a piece of chicken. The networks 203-206 in set of networks 201 are designed to determine if the input image includes items in four classes: chicken, soup, pasta, or turkey. The set of networks have a one-to-one correspondence with this set of classes. The set of networks 201 generates, in response to the applying of the image, a set of inferences 210 in the form of inferred classification probabilities that the image 202 includes an item from the class of items the corresponding network is designed to detect. The classification probabilities are the probabilities that the item is in a particular class. The set of inferences 210 are in a one-to-one correspondence with the set of networks in that each network generates a single inference. The main data flow of FIG. 2 terminates when the system identifies the largest probability in the set of inferences 210. The multiclass classifier system 200 then associates the item in the image as belonging to the class associated with the network that generated the largest probability 211. As such, in the illustrated example, the system would identify network 203 based on the probability "0.7" being the largest probability in set of inferences 210 and associate the item in image 202 with the class "chicken."

Figure 1:
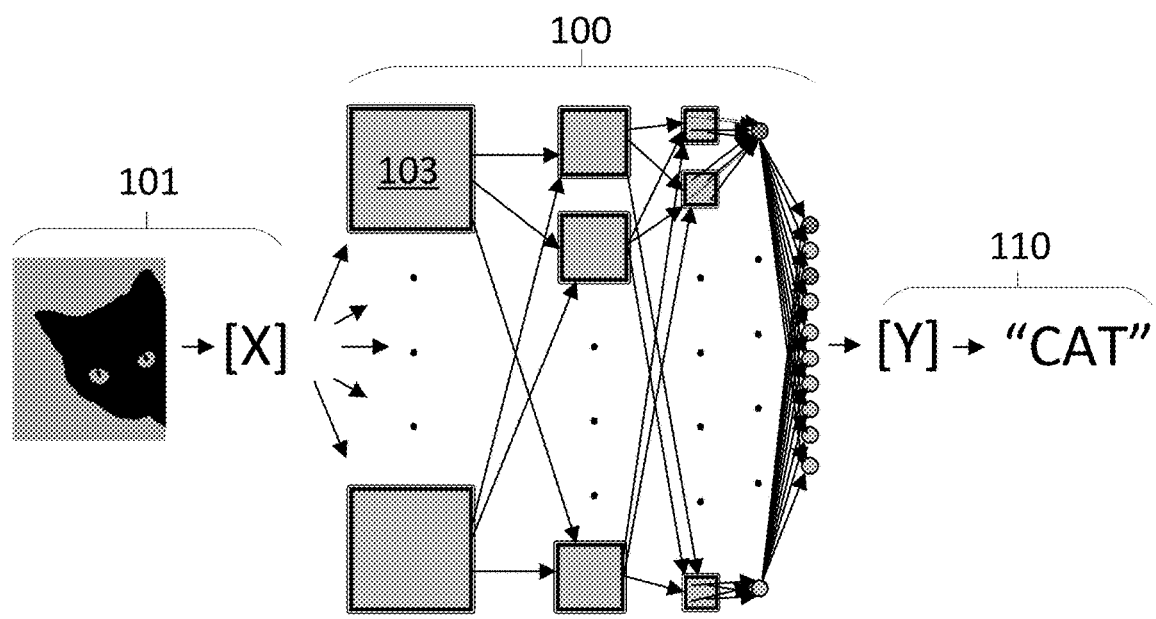
FIG. 1 is a data flow diagram of an ANN classifier classifying two encoded image inputs into two associated classes in accordance with the related art.
Figure 1:
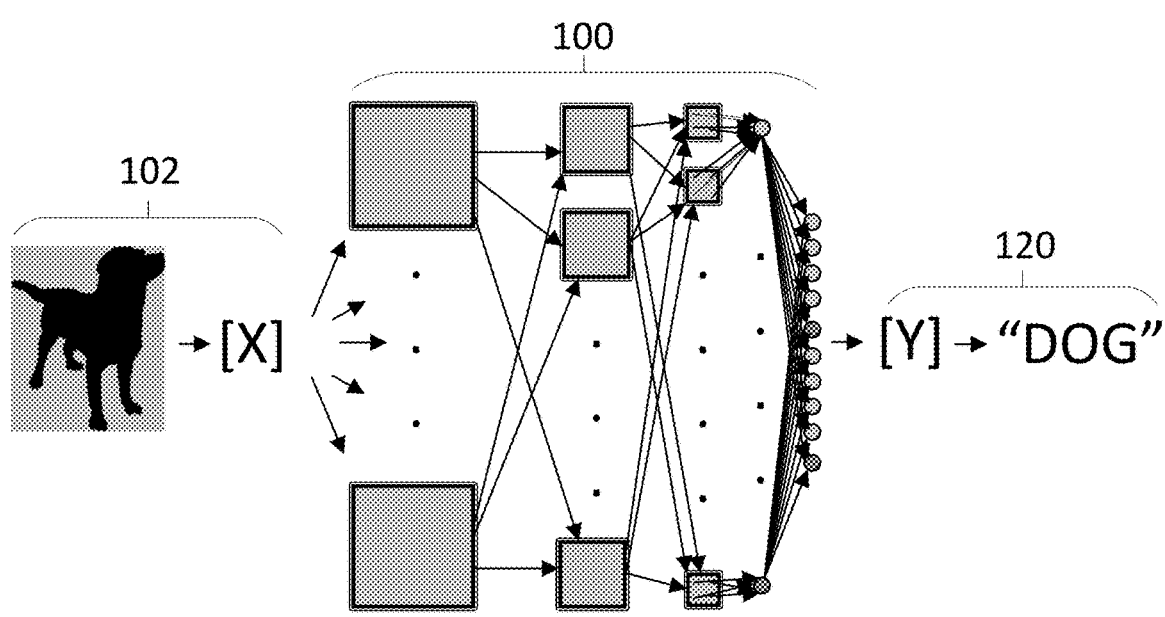

The networks in the set of networks 201 can be independently trained to identify items from a single class and can therefore be smaller and easier to train than the multiclass ANN classifier described with reference to FIG. 1. For example, network 203 can be a micromodel that has only been trained to identify chicken using images of chicken, thus simplifying the training data set. Furthermore, once the network 203 is trained to classify images as including chicken or not, it will not need to be readjusted if the other networks in set of networks 201 are retrained, removed, or if other networks are added. For example, if the operator of the multiclass classifier system 200 determined that they will also need to classify hot dogs in incoming images, all that is required is the addition of an additional micromodel 207 designed to classify hot dogs. Accordingly, the multiclass classifier system can be updated to recognize another class through the addition of an additional network to the set of networks with no other operative changes made to the set of networks in response to the update—thereby simplifying the addition of a class to the classifier system.

The classifications can be used for multiple purposes. Generally, the image or a data structure representative of the item can be associated with a given class and stored in memory by alternative systems for such purposes. For example, in a food vending environment a cart construct associated with a given user can have its virtual contents decremented or incremented with respect to the identified class when the image is recognized. An imager could be integrated with the food vending environment to capture the image as the user is removing the item from the environment for this purpose. As another example, a customized food preparation routine can be triggered or queued for use with the item based on the classification. As another example, a food storage environment can decrement or increment an inventory value for the identified class when the image is recognized. An imager could be integrated with the food storage environment to capture the image as the user is removing the item from the environment or adding the item to the environment for this purpose. As another example, the image itself can be displayed to a user and the user can be asked to verify the classification in order to harvest more ground truth data for online training of the system. The confirmation can be received in the ordinary course of the application to which the classification is being applied. For example, a user can be presented with a cart to confirm for checkout or given the option to verify and initiate a cooking cycle in which the classification is displayed for the user to confirm. The user can be given the option to manually correct the classification at the same time in order to harvest a supervisor for a failed classification, or manually confirm the classification at the same time in order to reinforce a correct classification.

Networks used in accordance with this disclosure can generate various outputs. As mentioned, the outputs can be a probability that an image includes an item from a class. The output can be a number on a scale from 0 to 1 where 1 represents absolute certainty that the image includes an item in the associated class and 0 represents absolute certainty that the image does not include an item in the associated class. Alternatively or in combination, the networks can output Boolean values such as "HotDog" or "!HotDog" 231. The comparison module that searches for the highest probability can thereby ignore any networks that generated Boolean values that indicate the image did not contain the associated class regardless of the relative size of any associated probability value.

In specific embodiments of the invention, the comparison module can be augmented with additional functionality to indicate fault conditions or to intuit additional information from an evaluation of the outputs from the set of networks. The comparison module can also be designed to throw a fault flag if none of the networks generate a probability above a given threshold. The way the comparison module operates can depend on the classifications. If the classes are mutually exclusive, tightly packed probabilities can be indicative of a fault, and the comparison module can be configured to throw a fault flag if multiple outputs are too close together in terms of their probabilities, particularly if the highest value probabilities are too closely packed. Alternatively, if the classes are not mutually exclusive, multiple associations can be formed for each of the probabilities that are over a given threshold. For example, a "frozen food" micromodel and a "chicken" micromodel could both provide outputs of above a 90% threshold indicating that the image included an item belonging to both classes (i.e., frozen chicken). A set of networks can have associated classes that have both mutually exclusive subgroups and potentially overlapping subgroups. As such, the comparison module can be informed regarding the relative relationships of the networks to infer a failed classification based on determinations that conflict with the relationships between the subgroups (i.e., one network is 90% sure the image contains steak and another is 90% sure the image contains chicken). The inferred failure in this case is based on the assumption that the image only contains one item. In specific embodiments of the invention, steps can be taken to assure that each image applied to the networks only includes one image as discussed below with reference to FIG. 5.

The classes associated with the networks in a set of networks, such as set of networks 201, can be for different food items, different preparations of specific food items, different sizes of food items, different temperatures of food items, and numerous other sets of classes. However, in specific embodiments of the invention, the classes will be entries in a menu such that the set of classifications is a menu. The menu can describe all the food items offered by a vendor in a food vending environment, all the food items stored or expected to be stored in a food storage environment, or all the food items that are expected to be applied to a given food cooking environment. In specific embodiments, the menu can be the set of classes associated with the set of networks in the multiclass classification system, such as set of networks 201. The items in the images applied to the classification system can be food items from the menu. The images can be visible light images captured by a visible light imager integrated with the food cooking, food storage, or food vending environment. Situations in which the set of classes are entries in a menu can experience a particular benefit from the approaches disclosed herein because the menu can be altered via the removal or addition of items with minimal effort compared to the time and effort required to retrain a large multiclass ANN classifier for a new set of potential classifications. In the example of FIG. 2, a new network 207 can be added to the set of networks 201 by instantiating the network in a memory, adjusting the system to route incoming images to the new network 207, along with the pre-existing networks, and allowing the comparison module to evaluate the inference generated by new network 207 along with the others inferences 210. The same process conducted with reference to image 202 can then be conducted with a second image, such as image 230, being applied to the reconstituted multiclass classifier system.

In specific embodiments of the invention, the encodings of the images can take on various formats depending on the image they encode and the characteristics of the set of networks in the multiclass classification system. The encodings will generally be matrixes of pixel or voxel values. The encoding of the images can be pixel encodings in the form of at least one two-dimensional matrix of pixel values. The spectral information included in each image can accordingly be accounted for by adding additional dimensions or increasing said dimensions in an encoding. For example, the encoding could be a grey scale encoding in which each pixel of the image included a value for the greys scale intensity of the image at a given location. As another example, the encoding could be an RGB-D encoding in which each pixel of the image includes an individual value for the three colors that comprise the texture content of the image and an additional value for the depth content of the pixel relative to the imager.

The input layer of each network can be configured to receive an encoding in the sense that the network will be able to process the input and deliver an output in response thereto. The input layer can be configured to receive the encoding in the sense that the first layer of operations conducted by the network can be mathematical operations with input variables of a number equivalent to the number of variables that encode the encodings. For example, the first layer of operations could be a filter multiply operation with a 5-element by 5-element matrix of integer values with a stride of 5, four lateral strides, and four vertical strides. In this case, the input layer would be configured to receive a 20-pixel by 20-pixel grey scale encoding of an image. However, this is a simplified example and those of ordinary skill in the art will recognize that the first layer of operations in a network, such as a deep-CNN, can be far more complex and deal with much larger data structures. Furthermore, a single encoding may be broken into segments that are individually delivered to the first layer via a pre-processing step. Additional pre-processing may be conducted on the encoding before it is applied to the first layer such as converting the element data structures from floating point to integer values etc. The encoding of the image itself, or any encoding derived therefrom using the kinds of preprocessing mentioned above can be referred to herein as an encoding "derived from an image."

In specific embodiments of the invention, the networks used, such as network 203, include an output layer with at least one output node. The output layer could conduct mathematical operations such as matrix multiplications or convolutions on values internal to the network in order to generate values for the probability that an input image included an item in the class associated with the network. The output nodes could be configured to provide an output based on an image as received at the input layer and the set of internal weights of the network. For example, the output node could be linked to a set of nodes in a hidden layer of the network, and conducted a mathematical operation on the values delivered from those nodes in combination with a subset of the internal weights in order to generate a Boolean value indicating whether an input image included an item from a class associated with the network and/or a numerical probability for the same.

In specific embodiments of the invention, the networks used, such as network 203, can be shallow CNNs. The first layer of the network can be a convolution layer with relatively large filters—relative to the size of the input. The second layer can be a max pooling layer with strident convolutions that skip pixels to down sample. The later layers can be a combination of optional additional max pooling layers and fully connected layers. The output layer of the network can be a single fully connected node producing a probability output on the order of 0 to 1.

In specific embodiments of the invention, the networks disclosed herein can be instantiated in a set of distributed locales and be administrated by a centralized system for managing the sets of networks operating at each locale. The centralized system could maintain a library of networks where each entry in the library was a micromodel configured to identify a single class. The networks could be transmitted to the various distributed locals in order to add to the set of networks operating therein. The centralized system could also assist with collecting data for continual online training of the various networks. The online training could be used to continue to train the networks in the library of networks and transmit updated networks to the various distributed locales as the performance of the networks increased. The updates could be sent periodically or based on some other factor such as in response to a detected threshold of performance increase being detected. The centralized system can detect this performance increase by testing the updated model against a set of stored tagged test data.

Figure 3:
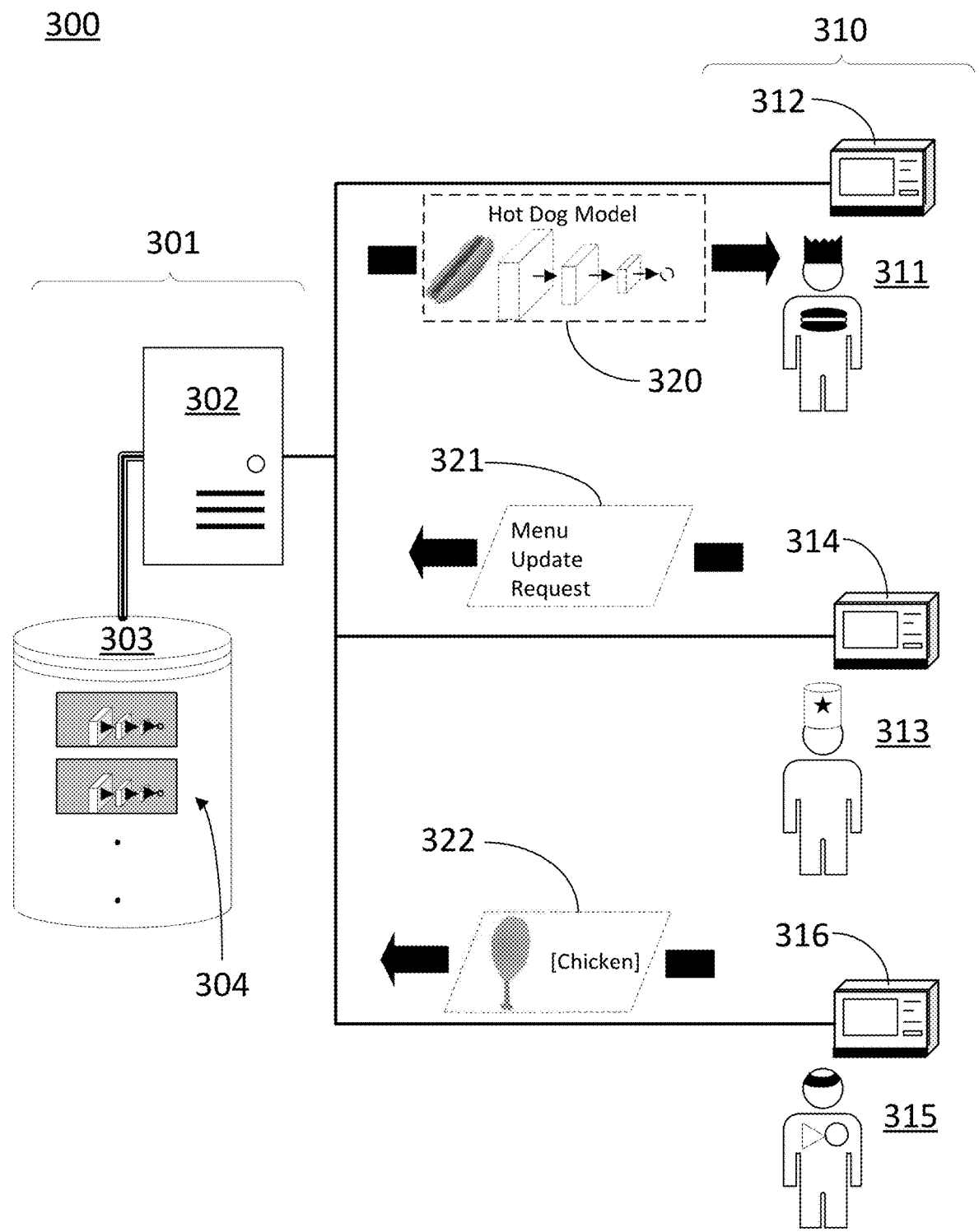
FIG. 3 is a dataflow diagram of a centralized system for administrating multiclass classification systems instantiated at a set of distributed locales in accordance with specific embodiments of the invention disclosed herein.

FIG. 3 provides an environment in which updates for a set of instantiated networks and continued online training could take place. FIG. 3 illustrates a data flow diagram 300 including a cloud architecture 301 operatively connected to a set of distributed locales 310 via a network such as the Internet. The cloud architecture 301 can be a centralized system for managing the sets of networks instantiated at each of the distributed locales 310. The cloud architecture could include a server 302 for communicating over the network and could maintain a library of networks 304 stored in a database 303 accessible to the server 302. The cloud architectures could administrate the transmission of models to the distributed locales, and the sharing of training data amongst the distributed locales in situations in which a given network was used in more than one locale. In the illustrated case, the distributed locales are food preparation environments 311, 313, and 315 in the form of restaurants that each maintain their own menus, but all utilize the same food preparation equipment in the form of a specific model of electronic oven 312, 314, and 316. The electronic oven can be manufactured and distributed by the same entity that manages cloud architecture 301, but they do not need to be the same entity. Usage of the same electronic oven is for explanatory purposes only as the classifier will be used to apply the appropriate cooking routine to an item once the item has been classified using the approaches herein. However, the distributed locales can use their own instantiations of the classifiers disclosed herein for whatever reason they need such as for inventory management or for automated computer vision-based vending.

The sets of networks instantiated at the distributed locales can be updated in various ways. In specific embodiments of the invention, the sets of networks can be updated as a manager of the distributed locale decides to alter a menu for which the classifier is meant to operate with. Updating the set of networks can include deleting or adding networks to the set of networks to either delete or add items to the menu. In specific embodiments of the invention, the deletion and addition of items on the menu only requires the deletion and addition of networks to the set of networks in the multiclass classifier system instantiated at the locale and does not require any other operative changes to the set of networks.

In specific embodiments where the set of classes are a menu, the menu updates can be conducted by deleting a network from the set of networks or by adding a network to the set of networks. The deletion of a network from the set of networks can be conducted locally at a distributed locale such as distributed locale 313. However, the deletion can also be accompanied by a notification to cloud architecture 301 that the menu of distributed locale 313 has changed. The addition of networks to the set of networks can be conducted locally by loading a network stored in memory at the locale, or it can be done by downloading the network from server 302 via a network connection to cloud architecture 301. FIG. 3 shows the example of a menu update request 321 from distributed locale 313, which will be answered by the transmission of one or more networks down to distributed locale 313 from cloud architecture 301, and/or by logging the deletion of networks from the set of networks instantiated at distributed locale 313 as logged at cloud architecture 301.

FIG. 3 also shows the example of a network 320 being provided via download from cloud architecture 301 to distributed locale 311. The network 320 can then be used to modify the multiclass classification system at distributed locale 311 by adding network 320 to the set of networks that form the core of said classification system. Network download 320 can be provided in response to a request for a menu update from a user at distributed locale 311, or in response to a determination by cloud architecture 301 that network 320 was a substantial improvement over the current version of network 320 for the same classification that was currently being stored at distributed locale 311. This determination can be made by the cloud architecture based on continual training of networks stored in the cloud architecture or at other distributed locales. Cloud architecture 301 can keep a log of what versions of which networks have been distributed to which locales 311 in order to administrate the updating process.

In specific embodiments of the invention, ground truth training data can be harvested in the ordinary course of a multiclass classifier system's usage. In these embodiments, the output generated by the classifier system can be presented to a user along with a prompt for the user to verify or reject the classification. The user can also be provided with a prompt to provide the correct classification if the classification is rejected. The input provided by the user in response to this prompt can then serve as a supervisor for a training routine. The input provided by the user and the original image can then serve as an element of tagged training data. The data can be used to improve the specific multiclass classifier that generated the output, or it can be used across a network of devices with similar multiclass classifiers. The element of tagged training data can be uploaded to be stored on a cloud architecture such as cloud architecture 301.

The ground truth classification can be obtained in various ways. In specific embodiments, a user will be presented with a display to enable them to verify the output of the classifier. The process of harvesting the ground truth can involve displaying the item for which the output was generated on the display. The item can be displayed by displaying the original image, or an image of the same item captured by a different imager specifically for allowing the user to review the output. In alternative embodiments, the system may be configured to allow the user to directly view the item and the output of the classifier at the time the ground truth feedback is provided. For example, if the feedback were being provided for the classification of an item in a microwave with a semi-transparent door, the light in the microwave may be turned on to allow the user to view the item when providing the feedback. In alternative embodiments, the system will except the user to know the ground truth classification implicitly without displaying the item. For example, a user could be expected to remember what item was placed into a conventional oven when presented with a class for the item generated by a multiclass classification system. The output of the multiclass classification system can also be displayed to the user. The output can be a specific class that the multiclass classification system generated for the item. The output can be displayed as text, a canonical image for the class, or both. The output can also be provided to the user through an audio output from the system. The user can then provide a ground truth classification for the item, for the system to receive, in response to the presentation of the item and specific class.

The tagged training data can be used for training in various ways. Generally, the training data will be used in a training routine to alter the internal variables that define one or more networks. For example, if the networks where convolutional neural networks the tagged training data could be used to adjust the filter values of the network. In particular, since in specific embodiments of the invention the multiclass classifier includes a set of networks, the training data can be used to train one, a subset of, or the entire set of networks. For example, the training data can be applied solely to the network that produced the output used to generate the output of the overall classifier system, solely to the network that associated with the ground truth class, or to all the networks in the set. In the case of a single system, the system can conduct all the steps needed to collect and utilize the ground truth classification including: receiving a ground truth classification for the item; and training every network in the set of networks that comprise the system using the set of classification probabilities generated in response to an input image and the ground truth classification associated with the image. As stated above, the tagged training data can also be used to train networks located in locales that are in networked communication with the locale in which the tagged training data was obtained.

Figure 4:
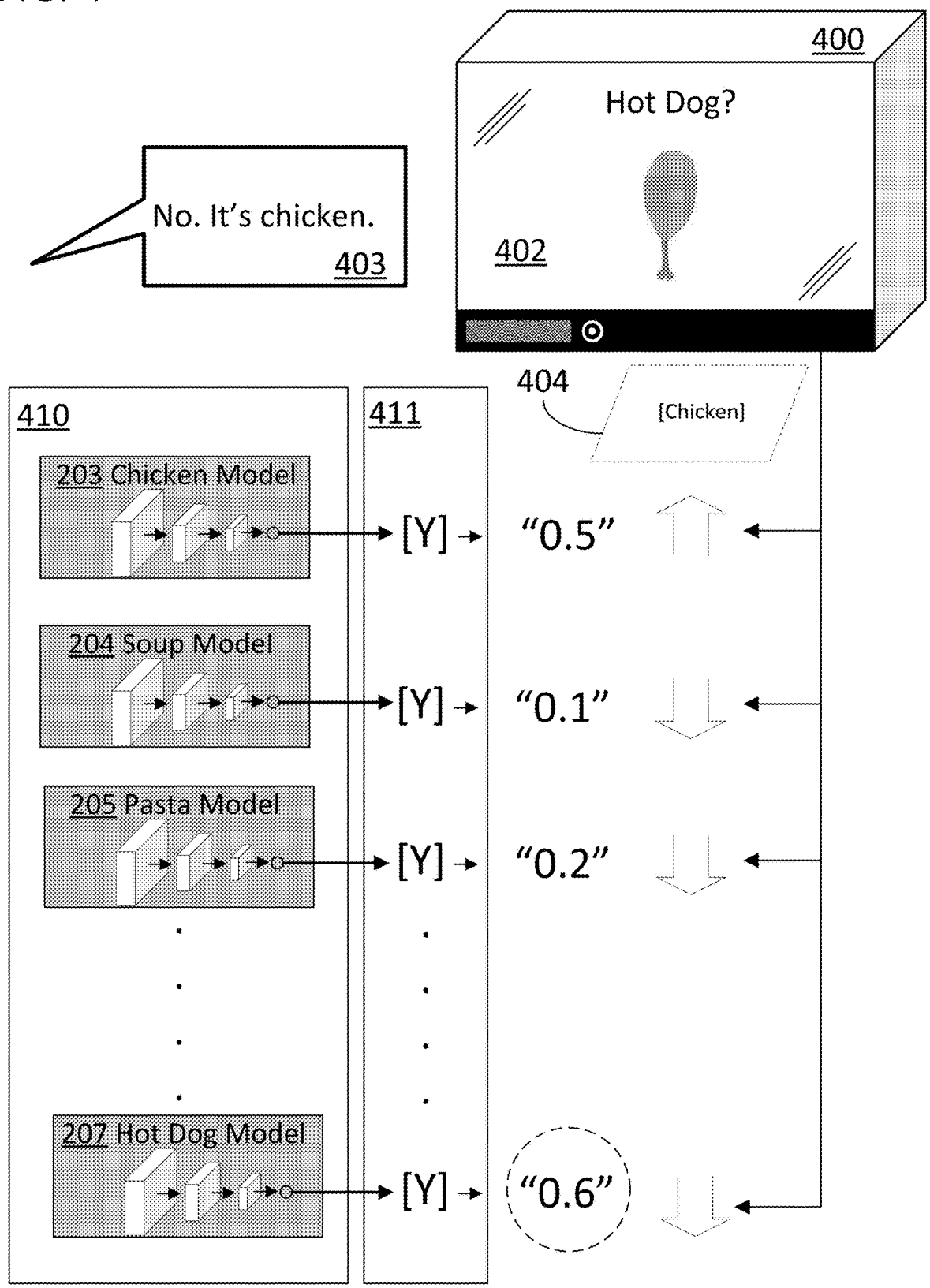
FIG. 4 is an illustration and associated data flow diagram for an online learning routine for a set of micromodels in accordance with specific embodiments of the invention disclosed herein.

FIG. 4 is an illustration and associated data flow diagram for an online learning routine for a set of micromodels in accordance with specific embodiments of the invention disclosed herein. The embodiments represented by FIG. 4 are in accordance with the embodiments described in the previous paragraphs. FIG. 4 includes an electronic oven 400 in which a multiclass classification system in accordance with specific embodiments of the invention has been instantiated. In the illustration, a piece of chicken has been placed in electronic oven 400, and the multiclass classification system has mistakenly classified the item as a hot dog. Set of networks 410 can be a part of the multiclass classification system instantiated in electronic oven 400 and the set of inferences 411 can be the inferences generated thereby that lead to the mistaken classification. The set of networks 410 can include networks 203, 204, 205, and 207 from FIG. 2.

FIG. 4 includes a display 402 on which the item and specific class are displayed. The specific class is displayed as a prompt, due to the fact that it is followed by a question mark. However, any other type of prompt could be used in its place. Furthermore, a prompt does not need to be provided and instead the specific class could be displayed along with an option to override the automated classification. The override could be in the form of a conspicuous "X" or other user interface element to allow the user to provide a correction, and thereby also provide a ground truth classification. The ground truth classification for the item provided in response to the display of the item and specific class could be provided in the form of a text or audio input. In FIG. 4, the response is provided as an audio input 403 directed to a microphone of the electronic oven 400. However, the input could also be provided on a touch screen keyboard or in response to a set of prompts. For example, a set of other high probability classes could be displayed to the user to allow them to select the proper class from a limited subset of choices based on the expectation that the ground truth still likely had a relatively high probability.

FIG. 4 also includes a data flow diagram for how the ground truth data can be used to train the multiclass classification system. As shown, the set of classification probabilities of inferences 411 generated by the multiclass classifier included hot dog as the highest probability, which is why the specific class displayed on display 402 was hot dog. The ground truth data 404 can therefore be used to adjust the hot dog network such that the probability given the same image would be less after the internal weights are adjusted. However, the ground truth data 404 can also be used to adjust the chicken network such that the probability given the same image would be greater after the internal weights are adjusted. Furthermore, the ground truth data 404 can be used to adjust all the networks that are not used to model the ground truth class as is illustrated by the decrease in probabilities for networks 204 and 205.

In specific embodiments of the invention, the training data in the form of the ground truth classification for the item, and the image of the item can be transmitted from a specific distributed locale back up to a cloud architecture in order to provide a central location to administrate online training across a set of distributed locations. If the cloud architecture stores a library of networks, the library can be updated by a training routine that is conducted either in the cloud architecture using the ground training data after it is routed up to the architecture, or by a training routine that is conducted at a distributed locale at the point where the training data is obtained. As shown in FIG. 3, tagged training data 322, which includes an image including chicken and a supervisor in the form of a ground truth classification of the item being chicken, can be transmitted up to cloud architecture 301. The tagged training data can then be used for the benefit of all distributed locales that may use the network associated with chicken, as cloud architecture 301 will use the data to train the network associated with chicken stored in library 304. Cloud architecture 301 can then distribute improved networks to various distributed locales as the performance of the networks stored in library 304 improved. Cloud architecture 301 can also test the performance of the networks stored in library 304 from time to time and distribute the networks if there has been an appreciable improvement in the performance thereof.

Figure 5:
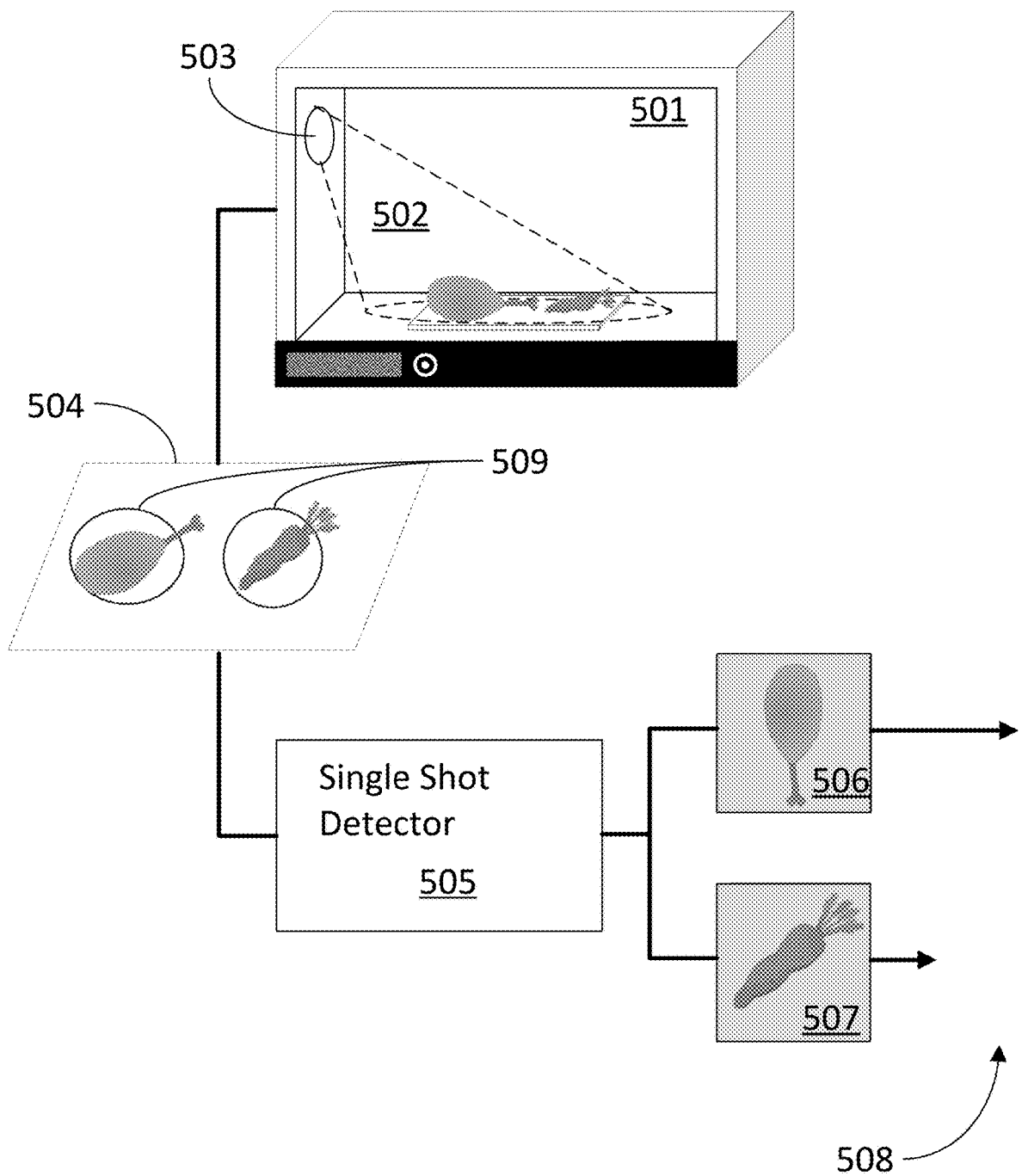
FIG. 5 is a data flow diagram for segmenting an input image for use with the set of micromodels from FIG. 2 in accordance with specific embodiments of the invention disclosed herein.

FIG. 5 is a data flow diagram 500 for segmenting an input image for use with the set of micromodels from FIG. 2 in accordance with specific embodiments of the invention disclosed herein. As stated previously, the images disclosed herein which are provided for classification, can be captured by imagers integrated with food preparation, food storage, or food vending environments. In the case of FIG. 5, the image is captured by a visible light imager with a field of view 502 of a heating chamber 501 of an electronic oven through an aperture 503 in the heating chamber. The images disclosed herein can be captured from a video stream or from still images that are captured based on movement in a specified zone or triggered by another event. In the case of FIG. 5, the image may be captured upon detecting that heating chamber 501 has been sealed by closing the door to the heating chamber. As illustrated in FIG. 5, the electronic oven could include more than one item. As such, the images captured by the imager, such as image 504, could first be segmented to assure that only one item is in each image.

In specific embodiments of the invention, the environment in which the imager is integrated could be configured to provide for separation between items to assist in the segmentation of items prior to delivering images to the multiclass classification systems. In the case of FIG. 5, the electronic oven cooking environment is configured to provide for separation between the food items in the set of food items placed in the heating chamber 501 because it has physical features 509 indicating where different items of food can be placed. In this case, the cooking environment includes a set of fixed positions for the multiple items identified by the physical features 509. Similar approaches can be used in alternative environments such as food vending or food storage environments using alternative physical features such as slotted shelving. In these embodiments, the set of fixed positions can be spaced apart such that the multiple items are isolated for segmentation when placed in those fixed positions.

In specific embodiments of the invention, the image can be provided to a single shot detector which uses standard computer vision or its own networks, to segment various items out of a single image into multiple images each with a single item. The single segmentation detector could be a Single Shot (Multibox) Detector (SSD). The standard computer vision techniques could segment items using an analysis of the encoding of the image such as by searching for edges in a two-dimensional texture map. In alternative embodiments, the image can be applied to an alternative object detection system such as one using R-CNN, Fast R-CNN, Faster R-CNN, YOLO, or other object detection algorithms.

In FIG. 5, image 504 is provided to a single shot detector 505. The segmentation detector could be pixel level accurate in its segmentation or simply generate bounding boxes for the items. In the case of FIG. 5, the items are delineated by continuous closed paths because the physical features 509 of the electronic oven assured that the items would not be in contact. In alternative embodiments, the image captured by the imager could just be segmented using a closed form process such as by cutting the image into different pieces centered on the physical features 509. The set of embodiments in which the environment is configured to provide for separation between the items and the set of embodiments in which a segmentation detector is utilized to process the image can include two mutually exclusive subsets as either approach can be used without the other. However, using the two in combination provides certain benefits in that a simpler segmentation detector can be relied upon while still providing greater certainty than the configuration of the environment alone.

In specific embodiments of the invention in which a segmentation is conducted, additional preprocessing can be conducted prior to applying the image or images to the set of networks. In particular, in embodiments in which multiple images are generated each containing an image that needs to be classified, the images can be staggered so that they are delivered to the networks in sequence. As shown in FIG. 5 segmented image 506 and segmented image 507 are staggered 508 before being applied to the set of networks. Additionally, the images can be screened to select one image containing an item that needs to be classified while spurious item images are discarded. Furthermore, the individual images can undergo preprocessing by altering various parameters to improve the performance of the set of networks. In the case of visible light images, the preprocessing can include altering the skew, zoom, contrast, or gamma of the images. The amount of preprocessing conducted can depend on the characteristics of the set of networks and can involve rendering the images compatible for delivery to the networks or to alter them slightly to match a paradigm used in the training data set used to train them such as digitally adjusting the lighting or relative orientation of the item in the image.

Figure 6:
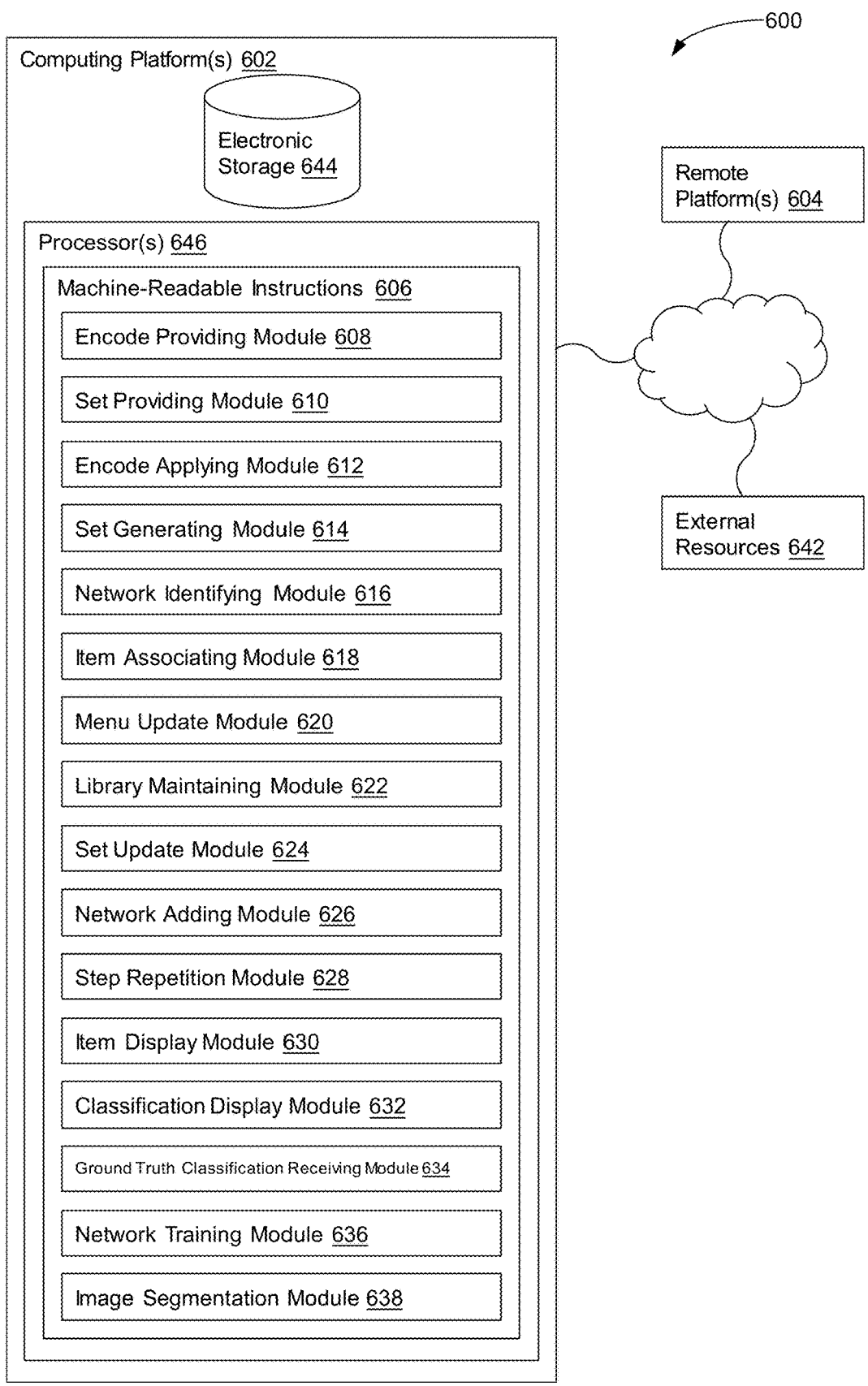
FIG. 6 illustrates a block diagram for a system configured to classify items from images using micromodels in accordance with specific embodiments of the invention disclosed herein.

FIG. 6 illustrates a block diagram for a system 600 configured to classify items in images using a multiclass classifier based on a set of networks in accordance with some of the approaches disclosed herein. In some implementations, system 600 may include one or more computing platforms 602. Computing platform(s) 602 may be configured to communicate with one or more remote platforms 604 according to a client/server architecture, a peer-to-peer architecture, and/or other architectures. Remote platform(s) 604 may be configured to communicate with other remote platforms via computing platform(s) 602 and/or according to a client/server architecture, a peer-to-peer architecture, and/or other architectures. Users may access system 600 via remote platform(s) 604.

Computing platform(s) 602 may be configured by machine-readable instructions 606. Machine-readable instructions 606 may include one or more instruction modules. The instruction modules may include computer program modules. The instruction modules may include one or more of encode providing module 608, set providing module 610, encode applying module 612, set generating module 614, network identifying module 616, item associating module 618, menu update module 620, library maintaining module 622, set update module 624, network adding module 626, step repetition module 628, item display module 630, classification display module 632, ground truth classification receiving module 634, network training module 636, image segmentation module 638, an environment configuration module, and/or other instruction modules.

Encode providing module 608 may be configured to provide an encoding derived from an image of an item. The image may be a visible light image captured by a visible light imager integrated with a food-cooking or food-vending environment. The item may be a food item from a menu. The encoding may be an encoding of the segmented image. The image may be captured by a visible light imager integrated with a food-cooking or food-vending environment. Set providing module 610 may be configured to provide a set of networks. The set of networks may have a one-to-one correspondence with a set of classes. The menu may be the set of classes. The set of networks may be a set of micromodels. The micromodels in the set of micromodels are single class classifiers.

Encode applying module 612 may be configured to individually apply the encoding to each network in the set of networks.

Set generating module 614 may be configured to generate, in response to the applying, a set of classification probabilities. The set of networks may have a one-to-one correspondence with the set of classes. The networks in the set of networks are convolutional neural networks.

Network identifying module 616 may be configured to identify a specific network in the set of networks which generated the largest classification probability in the set of classification probabilities.

Item associating module 618 may be configured to associate the item with a specific class from the set of classes. The specific network may correspond with the specific class in the one-to-one correspondence.

Menu update module 620 may be configured to update the menu by adding a new network to the set of networks.

Library maintaining module 622 may be configured to maintain a library of networks on a server. The library may be updated by the training.

Set update module 624 may be configured to update the set of networks via a network connection as the menu is altered. No other operative changes may be made to the set of networks in response to the updating of the menu. The updating may be conducted by downloading the network from the server. The updating may further include deleting a departing network from the set of networks as an associated departing food item is removed from the menu. The updating further includes adding a new network to the set of networks as an associated new food item may be added to the menu. No other operative changes may be made to the set of networks in response to the departing food item being removed and the new food item being added. The set of classes are a menu. The set of classes may be probabilities that the item is each of the food items in the menu.

Network adding module 626 may be configured to add a new network to the set of networks. The new network may correspond with a new classification.

Figure 7A:
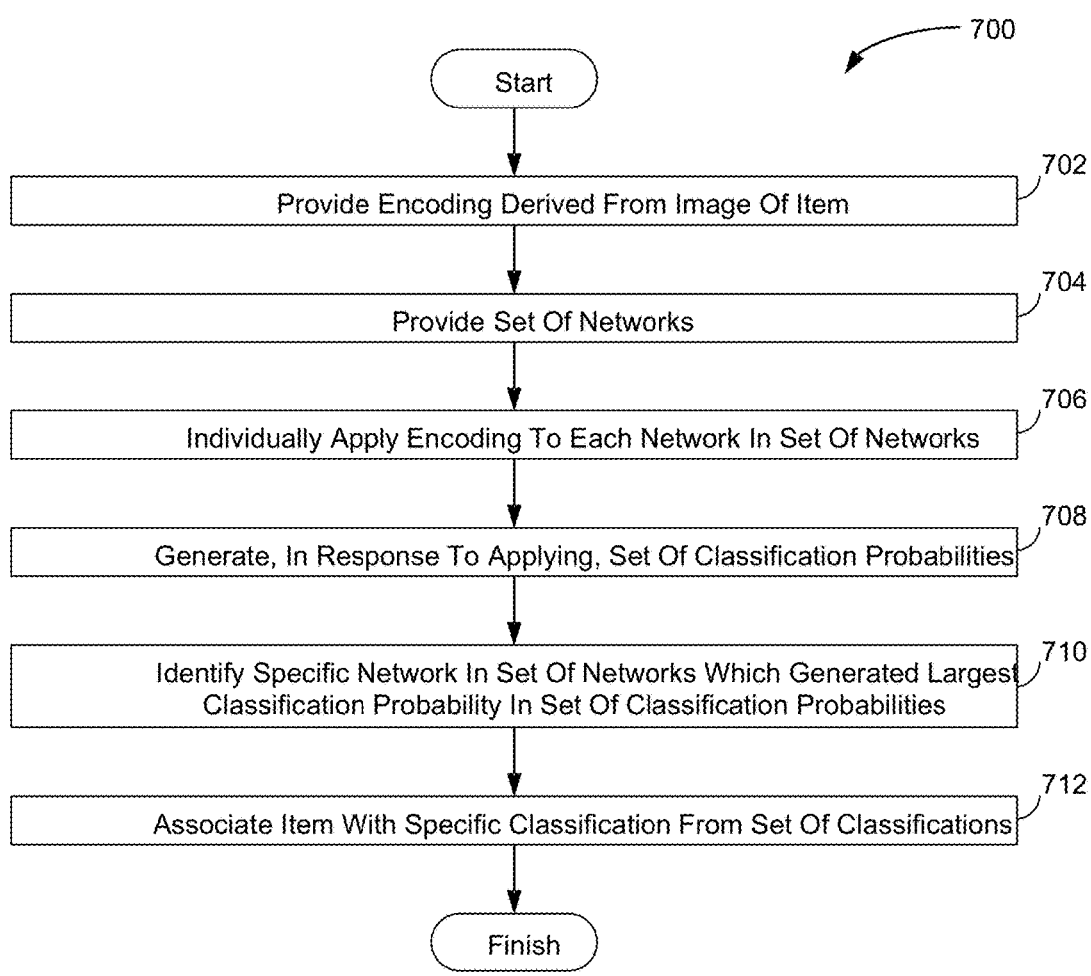
FIGS. 7A, 7B, 7C, 7D, 7E, 7F, 7G, 7H, 7I, 7J, and 7K illustrate flow charts for a set of methods to classify items from images using micromodels in accordance with specific embodiments of the invention disclosed herein.

Step repetition module 628 may be configured to repeat the steps of FIG. 7A with a second image and with the new network.

Item display module 630 may be configured to display the item on a display.

Classification display module 632 may be configured to display the specific class on the display.

Ground truth classification receiving module 634 may be configured to receive a ground truth classification for the item in response to the display of the item and specific class.

Ground truth classification receiving module 634 may be configured to receive a ground truth classification for the item.

Network training module 636 may be configured to train every network in the set of networks using the set of classification probabilities and the ground truth classification. Network training module 636 may complete such action by adjusting filter values for every network in the set of networks.

Image segmentation module 638 may be configured to segment the image. The image may include multiple items, to produce a segmented image. The image may be captured by a visible light imager integrated with a food-cooking or food-vending environment with a set of fixed positions for the multiple items. The set of fixed positions may be spaced apart such that the multiple items are isolated for segmentation. The multiple items are items on the menu. In some implementations, the segmentation may be conducted using a single shot segmentation detector and items are delineated by continuous closed paths.

In some implementations, computing platform(s) 602, remote platform(s) 604, and/or external resources 642 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 602, remote platform(s) 604, and/or external resources 642 may be operatively linked via some other communication media.

A given remote platform 604 may include one or more processors configured to execute computer program modules. The computer program modules may be configured to enable an expert or user associated with the given remote platform 604 to interface with system 600 and/or external resources 642, and/or provide other functionality attributed herein to remote platform(s) 604. By way of non-limiting example, a given remote platform 604 and/or a given computing platform 602 may include one or more of a server, a desktop computer, a laptop computer, a handheld computer, a tablet computing platform, a NetBook, a Smartphone, a gaming console, and/or other computing platforms.

External resources 642 may include sources of information outside of system 600, external entities participating with system 600, and/or other resources. In some implementations, some or all of the functionality attributed herein to external resources 642 may be provided by resources included in system 600.

Computing platform(s) 602 may include electronic storage 644, one or more processors 646, and/or other components. Computing platform(s) 602 may include communication lines, or ports to enable the exchange of information with a network and/or other computing platforms. Illustration of computing platform(s) 602 in FIG. 6 is not intended to be limiting. Computing platform(s) 602 may include a plurality of hardware, software, and/or firmware components operating together to provide the functionality attributed herein to computing platform(s) 602. For example, computing platform(s) 602 may be implemented by a cloud of computing platforms operating together as computing platform(s) 602.

Electronic storage 644 may comprise non-transitory storage media that electronically stores information. The electronic storage media of electronic storage 644 may include one or both of system storage that is provided integrally (i.e., substantially non-removable) with computing platform(s) 602 and/or removable storage that is removably connectable to computing platform(s) 602 via, for example, a port (e.g., a USB port, a firewire port, etc.) or a drive (e.g., a disk drive, etc.). Electronic storage 644 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 644 may include one or more virtual storage resources (e.g., cloud storage, a virtual private network, and/or other virtual storage resources). Electronic storage 644 may store software algorithms, information determined by processor(s) 646, information received from computing platform(s) 602, information received from remote platform(s) 604, and/or other information that enables computing platform(s) 602 to function as described herein.

Processor(s) 646 may be configured to provide information processing capabilities in computing platform(s) 602. As such, processor(s) 646 may include one or more of a digital processor, an analog processor, a digital circuit designed to process information, an analog circuit designed to process information, a state machine, and/or other mechanisms for electronically processing information. Although processor(s) 646 is shown in FIG. 6 as a single entity, this is for illustrative purposes only. In some implementations, processor(s) 646 may include a plurality of processing units.

These processing units may be physically located within the same device, or processor(s) 646 may represent processing functionality of a plurality of devices operating in coordination. Processor(s) 646 may be configured to execute modules 608, 610, 612, 614, 616, 618, 620, 622, 624, 626, 628, 630, 632, 634, 636, and/or 638, and/or other modules. Processor(s) 646 may be configured to execute modules 608, 610, 612, 614, 616, 618, 620, 622, 624, 626, 628, 630, 632, 634, 636, and/or 638, and/or other modules by software; hardware; firmware; some combination of software, hardware, and/or firmware; and/or other mechanisms for configuring processing capabilities on processor(s) 646. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 608, 610, 612, 614, 616, 618, 620, 622, 624, 626, 628, 630, 632, 634, 636, and/or 638 are illustrated in FIG. 6 as being implemented within a single processing unit, in implementations in which processor(s) 646 includes multiple processing units, one or more of modules 608, 610, 612, 614, 616, 618, 620, 622, 624, 626, 628, 630, 632, 634, 636, and/or 638 may be implemented remotely from the other modules. The description of the functionality provided by the different modules 608, 610, 612, 614, 616, 618, 620, 622, 624, 626, 628, 630, 632, 634, 636, and/or 638 described below is for illustrative purposes, and is not intended to be limiting, as any of modules 608, 610, 612, 614, 616, 618, 620, 622, 624, 626, 628, 630, 632, 634, 636, and/or 638 may provide more or less functionality than is described. For example, one or more of modules 608, 610, 612, 614, 616, 618, 620, 622, 624, 626, 628, 630, 632, 634, 636, and/or 638 may be eliminated, and some or all of its functionality may be provided by other ones of modules 608, 610, 612, 614, 616, 618, 620, 622, 624, 626, 628, 630, 632, 634, 636, and/or 638. As another example, processor(s) 646 may be configured to execute one or more additional modules that may perform some or all of the functionality attributed below to one of modules 608, 610, 612, 614, 616, 618, 620, 622, 624, 626, 628, 630, 632, 634, 636, and/or 638.

FIGS. 7A, 7B, 7C, 7D, 7E, 7F, 7G, 7H, 7I, 7J, and/or 7K illustrate a flow chart for a method of using a set of networks to classify an item. In accordance with some of the approaches disclosed herein. The operations of method 700 presented below are intended to be illustrative. In some implementations, method 700 may be accomplished with one or more additional operations not described, and/or without one or more of the operations discussed. Additionally, the order in which the operations of method 700 are illustrated in FIGS. 7A, 7B, 7C, 7D, 7E, 7F, 7G, 7H, 7I, 7J, and/or 7K and described below is not intended to be limiting.

In some implementations, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

FIG. 7A illustrates method 700, in accordance with one or more implementations.

An operation 702 may include providing an encoding derived from an image of an item. Operation 702 may be performed by one or more hardware processors configured by machine-readable instructions including a module that is the same as or similar to encode providing module 608, in accordance with one or more implementations.

An operation 704 may include providing a set of networks. The set of networks may have a one-to-one correspondence with a set of classes. Operation 704 may be performed by one or more hardware processors configured by machine-readable instructions including a module that is the same as or similar to set providing module 610, in accordance with one or more implementations.

An operation 706 may include individually applying the encoding to each network in the set of networks. Operation 706 may be performed by one or more hardware processors configured by machine-readable instructions including a module that is the same as or similar to encode applying module 612, in accordance with one or more implementations.

An operation 708 may include generating, in response to the applying, a set of classification probabilities. The set of networks may have a one-to-one correspondence with the set of classes. Operation 708 may be performed by one or more hardware processors configured by machine-readable instructions including a module that is the same as or similar to set generating module 614, in accordance with one or more implementations.

An operation 710 may include identifying a specific network in the set of networks which generated the largest classification probability in the set of classification probabilities. Operation 710 may be performed by one or more hardware processors configured by machine-readable instructions including a module that is the same as or similar to network identifying module 616, in accordance with one or more implementations.

An operation 712 may include associating the item with a specific class from the set of classes. The specific network may correspond with the specific class in the one-to-one correspondence. Operation 712 may be performed by one or more hardware processors configured by machine-readable instructions including a module that is the same as or similar to item associating module 618, in accordance with one or more implementations.

Figure 7B:
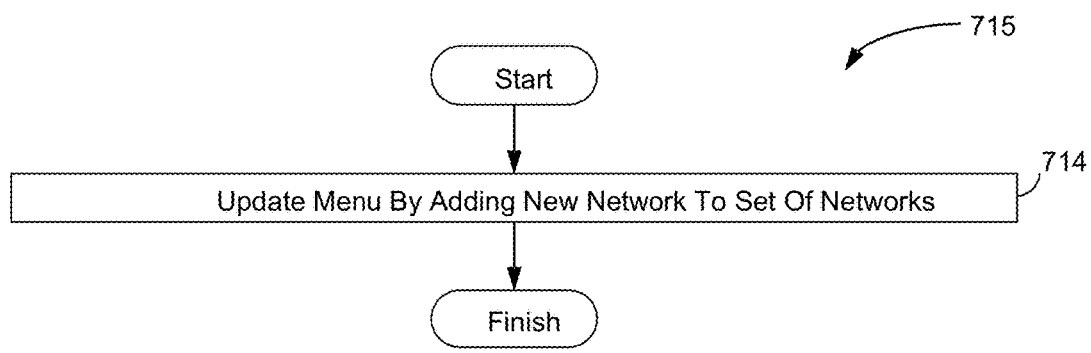

FIG. 7B illustrates method 715, in accordance with one or more implementations.

An operation 714 may include updating the menu by adding a new network to the set of networks. Operation 714 may be performed by one or more hardware processors configured by machine-readable instructions including a module that is the same as or similar to menu update module 620, in accordance with one or more implementations.

Figure 7C:
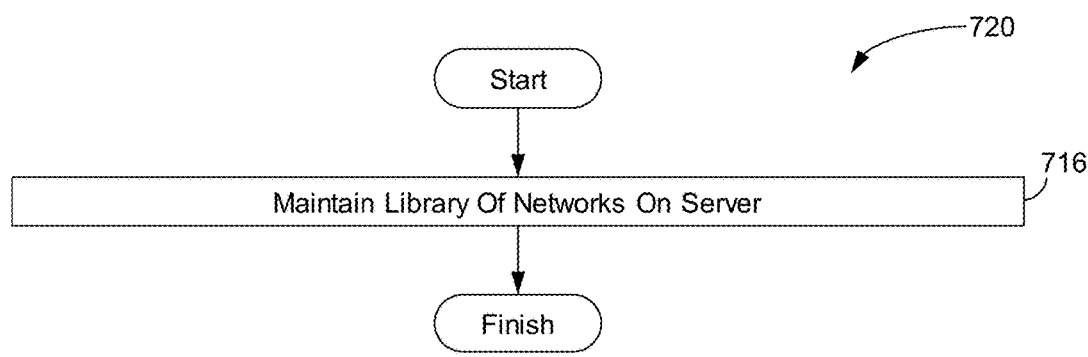

FIG. 7C illustrates method 720, in accordance with one or more implementations.

An operation 716 may include maintaining a library of networks on a server. Operation 716 may be performed by one or more hardware processors configured by machine-readable instructions including a module that is the same as or similar to library maintaining module 622, in accordance with one or more implementations.

Figure 7D:
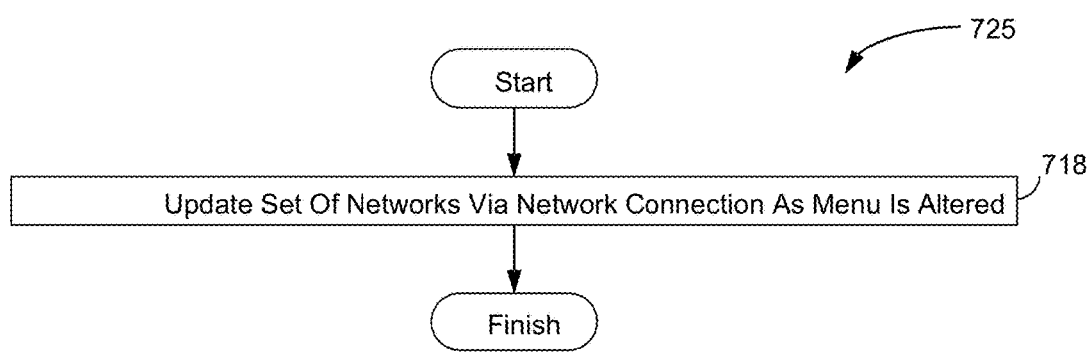

FIG. 7D illustrates method 725, in accordance with one or more implementations.

An operation 718 may include updating the set of networks via a network connection as the menu is altered. Operation 718 may be performed by one or more hardware processors configured by machine-readable instructions including a module that is the same as or similar to set update module 624, in accordance with one or more implementations.

Figure 7E:
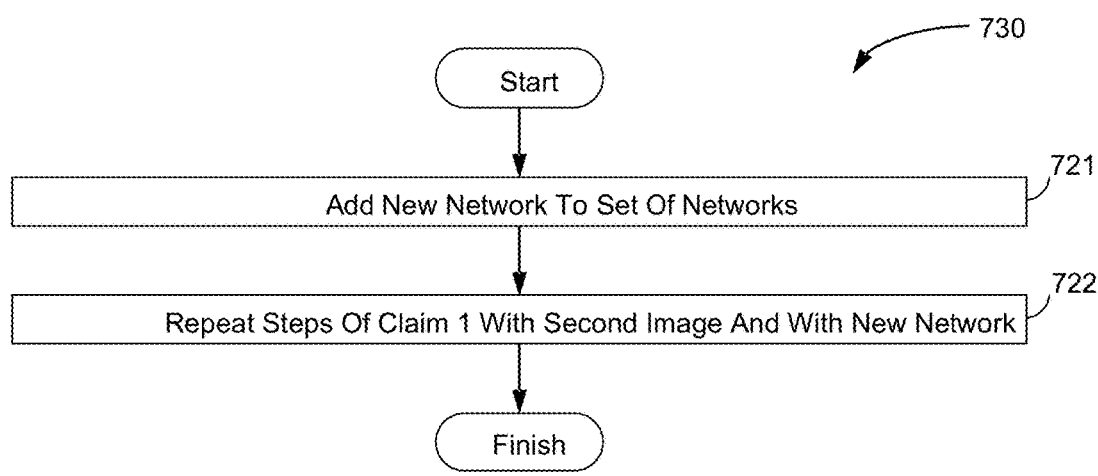

FIG. 7E illustrates method 730, in accordance with one or more implementations.

An operation 721 may include adding a new network to the set of networks. The new network may correspond with a new classification. Operation 721 may be performed by one or more hardware processors configured by machine-readable instructions including a module that is the same as or similar to network adding module 626, in accordance with one or more implementations.

An operation 722 may include repeating the steps of FIG. 7A with a second image and with the new network. Operation 722 may be performed by one or more hardware processors configured by machine-readable instructions including a module that is the same as or similar to step repetition module 628, in accordance with one or more implementations.

Figure 7F:
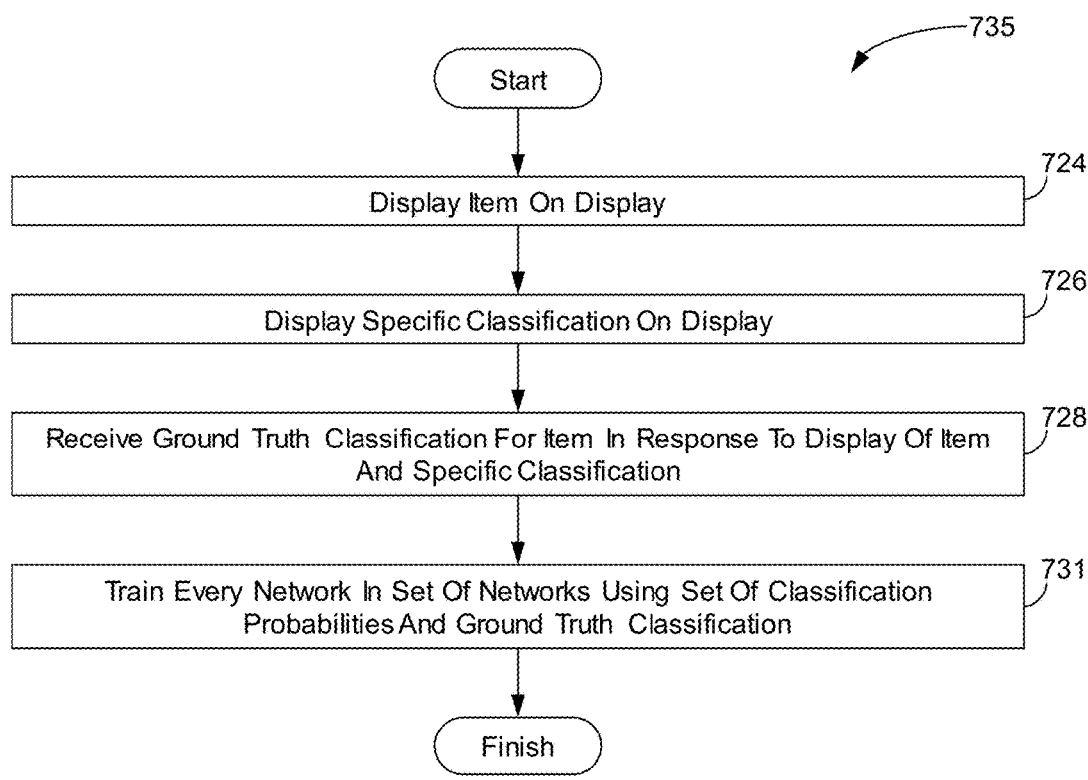

FIG. 7F illustrates method 735, in accordance with one or more implementations.

An operation 724 may include displaying the item on a display. Operation 724 may be performed by one or more hardware processors configured by machine-readable instructions including a module that is the same as or similar to item display module 630, in accordance with one or more implementations.

An operation 726 may include displaying the specific class on the display. Operation 726 may be performed by one or more hardware processors configured by machine-readable instructions including a module that is the same as or similar to classification display module 632, in accordance with one or more implementations.

An operation 728 may include receiving a ground truth classification for the item in response to the display of the item and specific class. Operation 728 may be performed by one or more hardware processors configured by machine-readable instructions including a module that is the same as or similar to ground truth classification receiving module 634, in accordance with one or more implementations.

An operation 731 may include training every network in the set of networks using the set of classification probabilities and the ground truth classification. Operation 731 may be performed by one or more hardware processors configured by machine-readable instructions including a module that is the same as or similar to network training module 636, in accordance with one or more implementations.

Figure 7G:
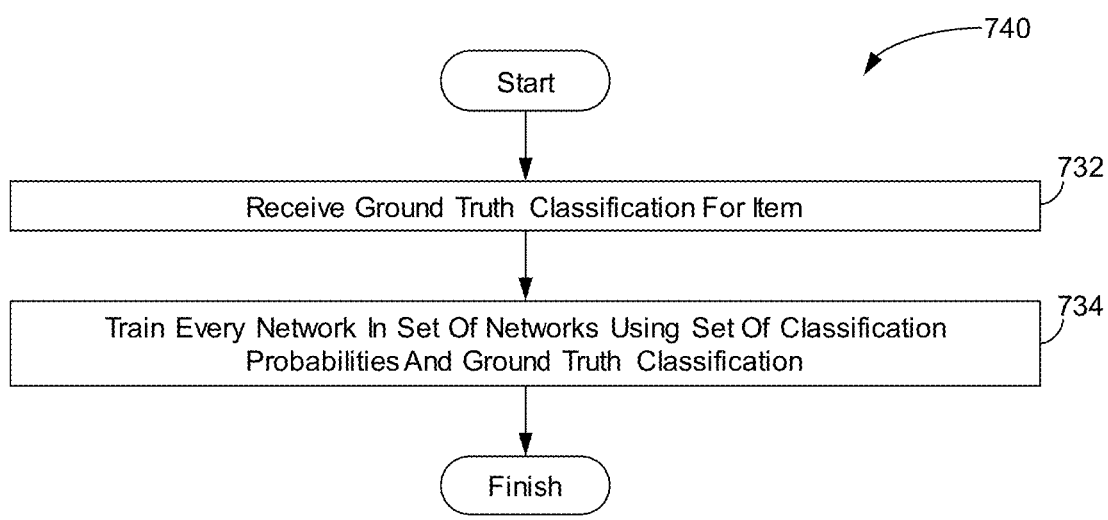

FIG. 7G illustrates method 740, in accordance with one or more implementations.

An operation 732 may include receiving a ground truth classification for the item. Operation 732 may be performed by one or more hardware processors configured by machine-readable instructions including a module that is the same as or similar to ground truth classification receiving module 634, in accordance with one or more implementations.

An operation 734 may include training every network in the set of networks using the set of classification probabilities and the ground truth classification. Operation 734 may be performed by one or more hardware processors configured by machine-readable instructions including a module that is the same as or similar to network training module 636, in accordance with one or more implementations.

Figure 7H:
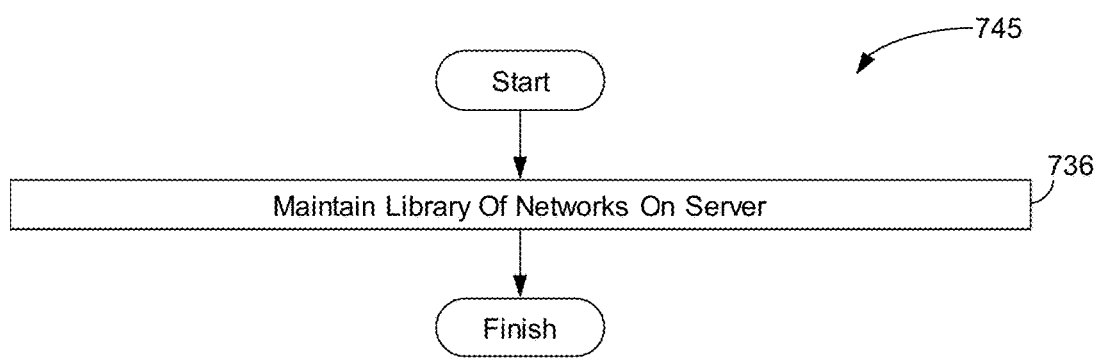

FIG. 7H illustrates method 745, in accordance with one or more implementations.

An operation 736 may include maintaining a library of networks on a server. Operation 736 may be performed by one or more hardware processors configured by machine-readable instructions including a module that is the same as or similar to library maintaining module 622, in accordance with one or more implementations.

Figure 7I:
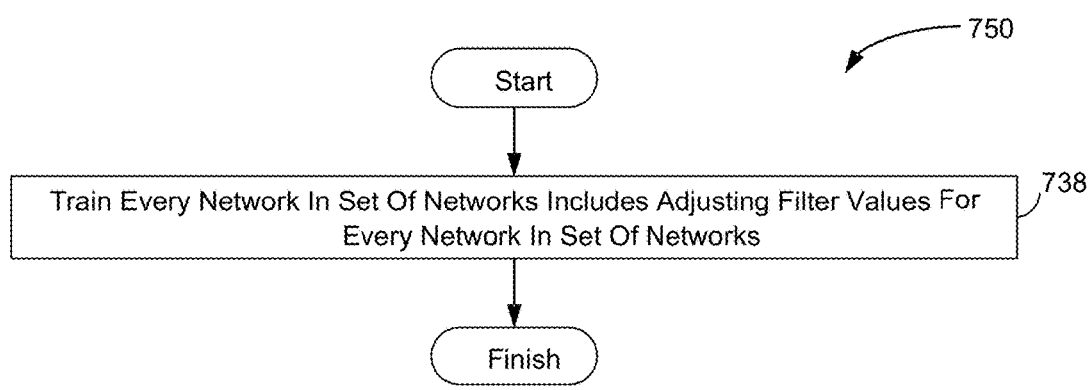

FIG. 7I illustrates method 750, in accordance with one or more implementations.

An operation 738 may include training every network in the set of networks includes adjusting filter values for every network in the set of networks. Operation 738 may be performed by one or more hardware processors configured by machine-readable instructions including a module that is the same as or similar to network training module 636, in accordance with one or more implementations.

Figure 7J:
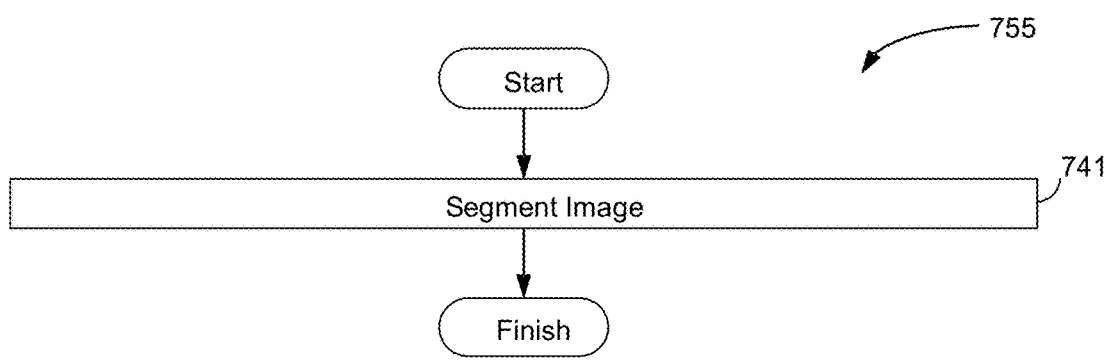

FIG. 7J illustrates method 755, in accordance with one or more implementations.

An operation 741 may include segmenting the image. The image may include multiple items, to produce a segmented image. Operation 741 may be performed by one or more hardware processors configured by machine-readable instructions including a module that is the same as or similar to image segmentation module 638, in accordance with one or more implementations.

Figure 7K:
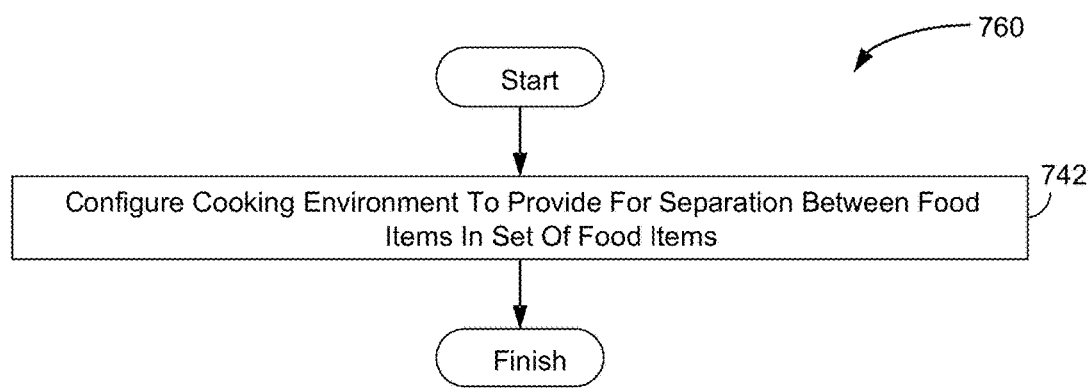

FIG. 7K illustrates method 760, in accordance with one or more implementations.

An operation 742 may include configuring the cooking environment to provide for separation between the food items in the set of food items. Operation 742 may be performed by one or more hardware processors configured by machine-readable instructions including an environment configuration module, in accordance with one or more implementations.

While the specification has been described in detail with respect to specific embodiments of the invention, it will be appreciated that those skilled in the art, upon attaining an understanding of the foregoing, may readily conceive of alterations to, variations of, and equivalents to these embodiments. While the example of a visible light camera was used throughout this disclosure to describe how an image can be captured, any sensor can function in its place to capture an image including depth sensors or RF sensors without any visible light capture. While language associated with ANNs was used throughout this disclosure any trainable function approximator can be used in place of the disclosed networks including support vector machines, and other function approximators known in the art. While the example of food items was used throughout this disclosure, the approaches disclosed herein can be applied to produce a multiclass classifier system for any set of items composed of items that are amenable to identification via a micromodel. Although the example of food preparation, storage, and vending environments were used throughout this disclosure, the multiclass classifier systems disclosed herein can be applied in any environment in which computer vision classification is applied, or to any environment in which classification generally is beneficially applied. Modifications and variations to the present invention may be practiced by those skilled in the art, without departing from the scope of the present invention, which is more particularly set forth in the appended claims.

What is claimed is:

1. A computer-implemented method, comprising:
providing an encoding derived from an image of an item;
providing a set of networks, wherein the set of networks has a one-to-one correspondence with a set of classes;
individually applying the encoding to each network in the set of networks;
generating, in response to the applying, a set of classification probabilities;
identifying a specific network in the set of networks which generated a largest classification probability in the set of classification probabilities; and
associating the item with a specific class from the set of classes, wherein the specific network corresponds with the specific class in the one-to-one correspondence;
wherein:
the image is a visible light image captured by a visible light imager integrated with a food-cooking or food-vending environment;
the item is a food item from a menu;
the menu is the set of classes;
the set of networks is a set of micromodels; and
the micromodels in the set of micromodels are single class classifiers.

2. The computer-implemented method of claim 1, further comprising:
receiving a ground truth classification for the item; and
training every network in the set of networks using the set of classification probabilities and the ground truth classification.

3. The computer-implemented method of claim 2, further comprising:
maintaining a library of networks on a cloud architecture;
wherein the library is updated by the training.

4. The computer-implemented method of claim 1, wherein:
the networks in the set of networks are convolutional neural networks;
the applying of the encoding to the network includes applying a set of filters to the image;
the image is a visible light image of the item;
the item is a food item from a menu;
the set of classes are the menu; and
the encoding is a pixel encoding of the image.

5. A computer-implemented method, comprising:
providing an encoding derived from an image of an item;
providing a set of networks, wherein the set of networks has a one-to-one correspondence with a set of classes;
individually applying the encoding to each network in the set of networks;
generating, in response to the applying, a set of classification probabilities;
identifying a specific network in the set of networks which generated a largest classification probability in the set of classification probabilities; and
associating the item with a specific class from the set of classes, wherein the specific network corresponds with the specific class in the one-to-one correspondence;
wherein:
the image is a visible light image captured by a visible light imager integrated with a food-cooking or food-vending environment;
the item is a food item from a menu; and
the menu is the set of classes;
the computer-implemented method further comprising:
updating the menu by adding a new network to the set of networks;
wherein no other operative changes are made to the set of networks in response to the updating of the menu.

6. The computer-implemented method of claim 5, further comprising:
maintaining a library of networks on a cloud architecture;
wherein the updating is conducted by downloading the new network from the cloud architecture.

7. A computer-implemented method, comprising:
providing an encoding derived from an image of an item;
providing a set of networks, wherein the set of networks has a one-to-one correspondence with a set of classes;
individually applying the encoding to each network in the set of networks;
generating, in response to the applying, a set of classification probabilities;
identifying a specific network in the set of networks which generated a largest classification probability in the set of classification probabilities; and
associating the item with a specific class from the set of classes, wherein the specific network corresponds with the specific class in the one-to-one correspondence;
wherein:
the image is a visible light image captured by a visible light imager integrated with a food-cooking or food-vending environment;
the item is a food item from a menu; and
the menu is the set of classes;
the computer-implemented method further comprising:
updating the set of networks via a network connection as the menu is altered.

8. The computer-implemented method of claim 7, wherein the updating further comprises:
deleting a departing network from the set of networks as an associated departing food item is removed from the menu;
adding a new network to the set of networks as an associated new food item is added to the menu; and
wherein no other operative changes are made to the set of networks in response to the associated departing food item being removed and the associated new food item being added.

9. A computer-implemented method, comprising:
providing an encoding derived from an image of an item;
providing a set of networks, wherein the set of networks has a one-to-one correspondence with a set of classes;
individually applying the encoding to each network in the set of networks;
generating, in response to the applying, a set of classification probabilities;
identifying a specific network in the set of networks which generated a largest classification probability in the set of classification probabilities;
associating the item with a specific class from the set of classes, wherein the specific network corresponds with the specific class in the one-to-one correspondence;
adding a new network to the set of networks, wherein the new network corresponds with a new classification; and
repeating, with a second image and with the new network, the steps of:
providing an encoding; providing a set of networks; individually applying the encoding;
generating a set of classification probabilities; identifying a specific network; and associating the item with a specific class.

10. The computer-implemented method of claim 9, wherein:
the image is a visible light image captured by a visible light imager integrated with a food-cooking or food-vending environment;
the item is a food item from a menu; and
the menu is the set of classes.

11. The computer-implemented method of claim 10, wherein:
the set of networks is a set of micromodels; and
the micromodels in the set of micromodels are single class classifiers.

12. A computer-implemented method, comprising:
providing an encoding derived from an image of an item;
providing a set of networks, wherein the set of networks has a one-to-one correspondence with a set of classes;
individually applying the encoding to each network in the set of networks;
generating, in response to the applying, a set of classification probabilities;
identifying a specific network in the set of networks which generated a largest classification probability in the set of classification probabilities;
associating the item with a specific class from the set of classes, wherein the specific network corresponds with the specific class in the one-to-one correspondence;
displaying the item on a display;
displaying the specific class on the display;
receiving a ground truth classification for the item in response to the display of the item and specific class; and
training every network in the set of networks using the set of classification probabilities and the ground truth classification.

13. A computer-implemented method, comprising:
providing an encoding derived from an image of an item;
providing a set of networks, wherein the set of networks has a one-to-one correspondence with a set of classes;
individually applying the encoding to each network in the set of networks;
generating, in response to the applying, a set of classification probabilities;
identifying a specific network in the set of networks which generated a largest classification probability in the set of classification probabilities;
associating the item with a specific class from the set of classes, wherein the specific network corresponds with the specific class in the one-to-one correspondence;
receiving a ground truth classification for the item; and
training every network in the set of networks using the set of classification probabilities and the ground truth classification;
wherein:
the networks in the set of networks are convolutional neural networks; and
training every network in the set of networks includes adjusting filter values for every network in the set of networks.

14. A computer-implemented method, comprising:
providing an encoding derived from an image of an item;
providing a set of networks, wherein the set of networks has a one-to-one correspondence with a set of classes;
individually applying the encoding to each network in the set of networks;
generating, in response to the applying, a set of classification probabilities;
identifying a specific network in the set of networks which generated a largest classification probability in the set of classification probabilities;
associating the item with a specific class from the set of classes, wherein the specific network corresponds with the specific class in the one-to-one correspondence; and
segmenting the image, wherein the image includes multiple items, to produce a segmented image;
wherein the encoding is an encoding of the segmented image.

15. The computer-implemented method of claim 14, further comprising:
configuring an environment to provide for separation between items in the multiple items;
wherein the segmenting is conducted using a single shot detector and items are delineated by continuous closed paths.

16. The computer-implemented method from claim 14, wherein:
the image is captured by a visible light imager integrated with a food-cooking or food-vending environment with a set of fixed positions for the multiple items; and
the set of fixed positions are spaced apart such that the multiple items are isolated for segmentation.

17. The computer-implemented method from claim 16, wherein:
the image is captured by a visible light imager integrated with a food-cooking or food-vending environment;
the set of classes are a menu;
the multiple items are food items on the menu;
the set of classification probabilities are probabilities that the item is each of the food items in the menu; and
the steps of: (i) providing an encoding; (ii) providing a set of networks; (iii) individually applying the encoding; (iv) generating a set of classification probabilities; (v) identifying a specific network; and (vi) associating the item with a specific class are repeated with the encoding being replaced by an encoding of a second segmented image from the image.

18. A non-transient computer-readable storage medium having instructions embodied thereon, the instructions being executable by one or more processors to perform a method, the method comprising:
providing an encoding derived from an image of an item;
providing a set of networks, wherein the set of networks has a one-to-one correspondence with a set of classes;
individually applying the encoding to each network in the set of networks;
generating, in response to the applying, a set of classification probabilities;
identifying a specific network in the set of networks which generated a largest classification probability in the set of classification probabilities; and
associating the item with a specific class from the set of classes, wherein the specific network corresponds with the specific class in the one-to-one correspondence;
wherein:
the image is a visible light image captured by a visible light imager integrated with a food-cooking or food-vending environment;
the item is a food item from a menu;
the menu is the set of classes;
the set of networks is a set of micromodels; and
the micromodels in the set of micromodels are single class classifiers.

19. A non-transient computer-readable storage medium having instructions embodied thereon, the instructions being executable by one or more processors to perform a method, the method comprising:
   providing an encoding derived from an image of an item;
   providing a set of networks, wherein the set of networks has a one-to-one correspondence with a set of classes;
   individually applying the encoding to each network in the set of networks;
   generating, in response to the applying, a set of classification probabilities;
   identifying a specific network in the set of networks which generated a largest classification probability in the set of classification probabilities; and
   associating the item with a specific class from the set of classes, wherein the specific network corresponds with the specific class in the one-to-one correspondence;
   wherein:
   the image is a visible light image captured by a visible light imager integrated with a food-cooking or food-vending environment;
   the item is a food item from a menu; and
   the menu is the set of classes;
   the method further comprising:
   updating the menu by adding a new network to the set of networks;
   wherein no other operative changes are made to the set of networks in response to the updating of the menu.

20. The computer-readable storage medium of claim 19, wherein:
   the set of networks is a set of micromodels; and
   the micromodels in the set of micromodels are single class classifiers.

21. The computer-readable storage medium of claim 19, wherein the method further comprises:
   maintaining a library of networks on a server;
   wherein the updating is conducted by downloading the new network from the server.

22. A non-transient computer-readable storage medium having instructions embodied thereon, the instructions being executable by one or more processors to perform a method, the method comprising:
   providing an encoding derived from an image of an item;
   providing a set of networks, wherein the set of networks has a one-to-one correspondence with a set of classes;
   individually applying the encoding to each network in the set of networks;
   generating, in response to the applying, a set of classification probabilities;
   identifying a specific network in the set of networks which generated a largest classification probability in the set of classification probabilities; and
   associating the item with a specific class from the set of classes, wherein the specific network corresponds with the specific class in the one-to-one correspondence;
   wherein:
   the image is a visible light image captured by a visible light imager integrated with a food-cooking or food-vending environment;
   the item is a food item from a menu; and
   the menu is the set of classes;
   the method further comprising:
   updating the set of networks via a network connection as the menu is altered.

23. The computer-readable storage medium of claim 22, wherein:
   the updating further comprises deleting a departing network from the set of networks as an associated departing food item is removed from the menu;
   the updating further comprises adding a new network to the set of networks as an associated new food item is added to the menu; and
   no other operative changes are made to the set of networks in response to the associated departing food item being removed and the associated new food item being added.

24. A system, the system comprising:
   one or more hardware processors configured by machine-readable instructions to:
   provide an encoding derived from an image of an item;
   provide a set of networks, wherein the set of networks has a one-to-one correspondence with a set of classes;
   individually apply the encoding to each network in the set of networks;
   generate, in response to the applying, a set of classification probabilities;
   identify a specific network in the set of networks which generated a largest classification probability in the set of classification probabilities; and
   associate the item with a specific class from the set of classes, wherein the specific network corresponds with the specific class in the one-to-one correspondence;
   wherein:
   the image is a visible light image captured by a visible light imager integrated with a food-cooking or food-vending environment;
   the item is a food item from a menu;
   the menu is the set of classes;
   the set of networks is a set of micromodels; and
   the micromodels in the set of micromodels are single class classifiers.

25. The system of claim 24, wherein the one or more hardware processors are further configured by machine-readable instructions to:
   update the set of networks via a network connection as the menu is altered.

26. A system, the system comprising:
   one or more hardware processors configured by machine-readable instructions to:
   provide an encoding derived from an image of an item;
   provide a set of networks, wherein the set of networks has a one-to-one correspondence with a set of classes;
   individually apply the encoding to each network in the set of networks;
   generate, in response to the applying, a set of classification probabilities;
   identify a specific network in the set of networks which generated a largest classification probability in the set of classification probabilities; and
   associate the item with a specific class from the set of classes, wherein the specific network corresponds with the specific class in the one-to-one correspondence;
   wherein:
   the image is a visible light image captured by a visible light imager integrated with a food-cooking or food-vending environment;

the item is a food item from a menu;
the menu is the set of classes; and
the one or more hardware processors are further configured by machine-readable instructions to:
update the menu by adding a new network to the set of networks;
wherein no other operative changes are made to the set of networks in response to the updating of the menu.

27. The system of claim 26, wherein:
the set of networks is a set of micromodels; and
the micromodels in the set of micromodels are single class classifiers.

28. The system of claim 26, wherein the one or more hardware processors are further configured by machine-readable instructions to:
maintain a library of networks on a server;
wherein the updating is conducted by downloading the new network from the server.

\* \* \* \* \*